United States Patent
Schuaf

(10) Patent No.: US 7,481,281 B2
(45) Date of Patent: *Jan. 27, 2009

(54) SYSTEMS AND METHODS FOR THE DRILLING AND COMPLETION OF BOREHOLES USING A CONTINUOUSLY VARIABLE TRANSMISSION TO CONTROL ONE OR MORE SYSTEM COMPONENTS

(75) Inventor: Stuart Schuaf, Houston, TX (US)

(73) Assignee: Intersyn IP Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/831,975

(22) Filed: Apr. 26, 2004

(65) Prior Publication Data

US 2004/0262043 A1    Dec. 30, 2004

Related U.S. Application Data

(60) Provisional application No. 60/465,395, filed on Apr. 25, 2003.

(51) Int. Cl.
*E21B 7/04* (2006.01)

(52) U.S. Cl. .................. 175/61; 73/862.045; 166/68.5; 74/113; 475/73; 475/83; 476/40; 474/12; 173/48

(58) Field of Classification Search ............ 175/61; 73/862.045; 166/68.5; 74/112, 113; 475/73, 475/83; 476/40; 474/12; 173/48
See application file for complete search history.

(56) References Cited

U.S. PATENT DOCUMENTS 2,136,356 A    11/1938  Hild
2,588,408 A    9/1952   O'Leary
2,939,681 A    6/1960   Owen
3,828,865 A *  8/1974   Schnizler, Jr. ................ 173/48
3,908,475 A *  9/1975   Takagi et al. .................. 474/12
RE29,526 E     1/1978   Jeter
4,103,281 A    7/1978   Strom et al.
4,544,041 A    10/1985  Rinaldi (Continued)

FOREIGN PATENT DOCUMENTS

GB    2 177 738    1/1987

OTHER PUBLICATIONS

International Search Report, PCT/US2004/012753, mailed Dec. 15, 2004.

*Primary Examiner*—Richard E Chilcot, Jr.
*Assistant Examiner*—Matthew J Smith
(74) *Attorney, Agent, or Firm*—Charles D. Huston; Daffer McDaniel, LLP

(57) ABSTRACT

Systems and methods for drilling a borehole are provided. One system includes a continuously variable transmission. An input shaft of the continuously variable transmission is coupled to a power supply. An output shaft of the continuously variable transmission is coupled to one or more system components such that the continuously variable transmission controls rotation of the one or more system components. One method for drilling a borehole includes supplying power to an input shaft of a continuously variable transmission. The method also includes controlling rotation of one or more system components using the continuously variable transmission during drilling of the borehole. The one or more system components are coupled to an output shaft of the continuously variable transmission. Also provided is a borehole that is drilled by this method.

57 Claims, 21 Drawing Sheets

U.S. PATENT DOCUMENTS

| | | | |
|---|---|---|---|
| 4,662,245 A * | 5/1987 | Taylor | 475/73 |
| 5,022,471 A | 6/1991 | Maurer et al. | |
| 5,050,692 A | 9/1991 | Beimgraben | |
| 5,113,953 A | 5/1992 | Noble | |
| 5,226,854 A * | 7/1993 | Hauser | 474/83 |
| 5,397,283 A | 3/1995 | Pratolongo | |
| 5,517,464 A | 5/1996 | Lerner et al. | |
| 5,546,822 A * | 8/1996 | Fowler | 74/113 |
| 5,685,379 A | 11/1997 | Barr et al. | |
| 5,738,178 A | 4/1998 | Williams et al. | |
| 5,875,859 A | 3/1999 | Ikeda et al. | |
| 6,086,339 A * | 7/2000 | Jeffrey | 417/415 |
| 6,092,610 A | 7/2000 | Kosmala et al. | |
| 6,109,372 A | 8/2000 | Dorel et al. | |
| 6,119,539 A * | 9/2000 | Papanicolaou | 74/112 |
| 6,244,361 B1 | 6/2001 | Comeau et al. | |
| 6,269,702 B1 * | 8/2001 | Lambson | 73/862.045 |
| 6,321,857 B1 | 11/2001 | Eddison | |
| 6,419,014 B1 | 7/2002 | Meek et al. | |
| 6,461,268 B1 | 10/2002 | Milner | |
| 6,536,520 B1 * | 3/2003 | Snider et al. | 166/78.1 |
| 6,581,699 B1 | 6/2003 | Chen et al. | |
| 6,764,427 B2 * | 7/2004 | Tamaki et al. | 476/40 |
| 6,923,273 B2 | 8/2005 | Terry et al. | |
| 2002/0112892 A1 | 8/2002 | Taylor | |
| 2002/0175003 A1 | 11/2002 | Pisoni et al. | |
| 2003/0094310 A1 | 5/2003 | Eppink et al. | |
| 2003/0127252 A1 | 7/2003 | Downton et al. | |

* cited by examiner

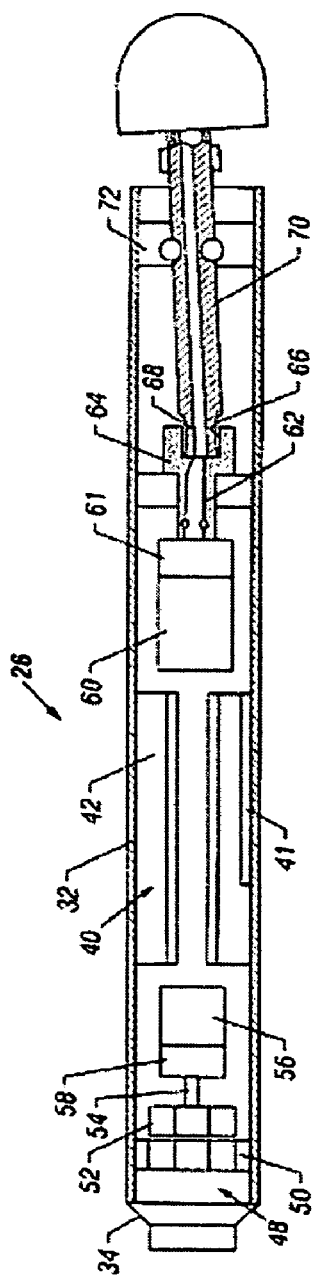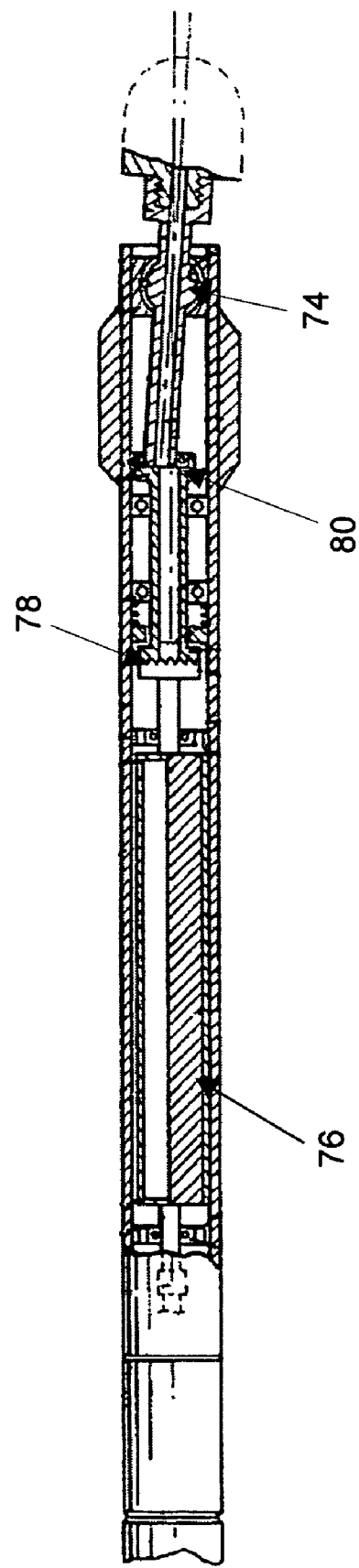
Fig. 1 (Related Art)
Fig. 2 (Related Art)

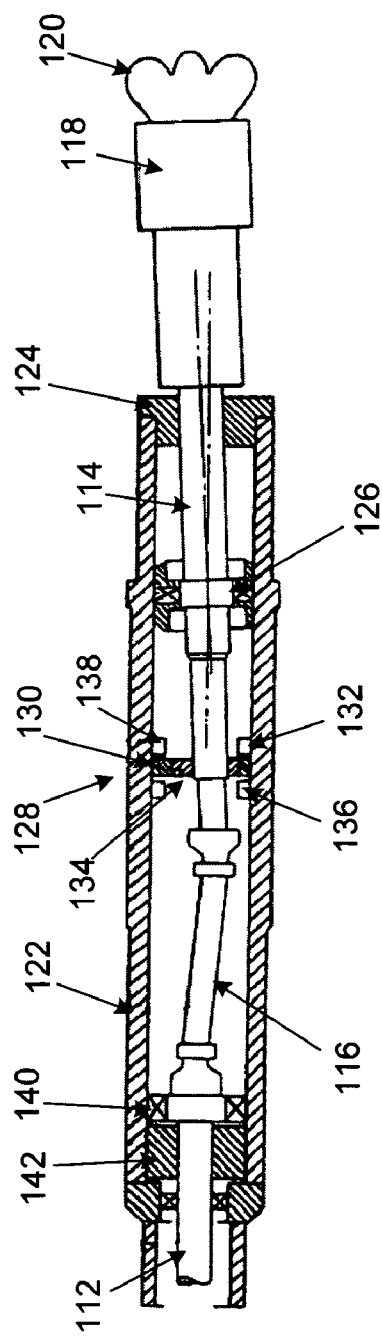
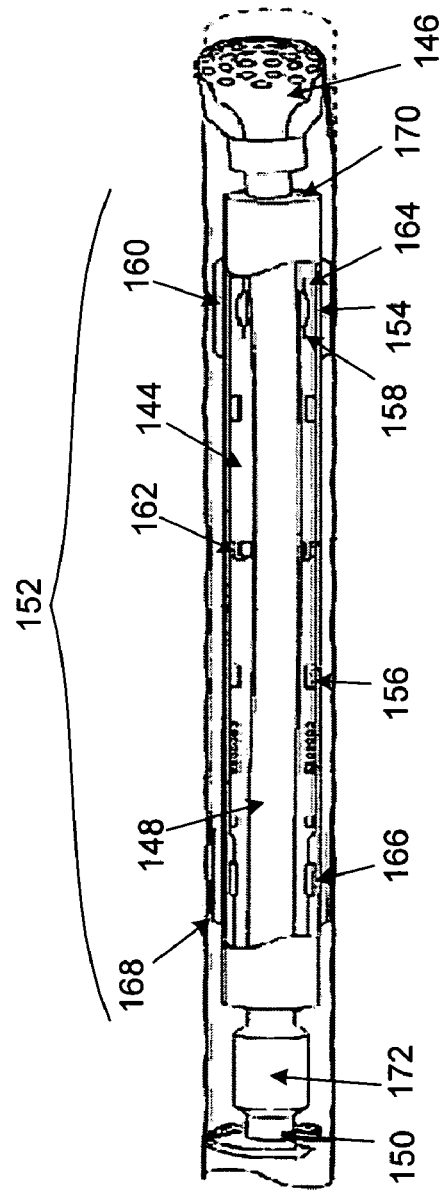
Fig. 5 (Related Art)
Fig. 6 (Related Art)

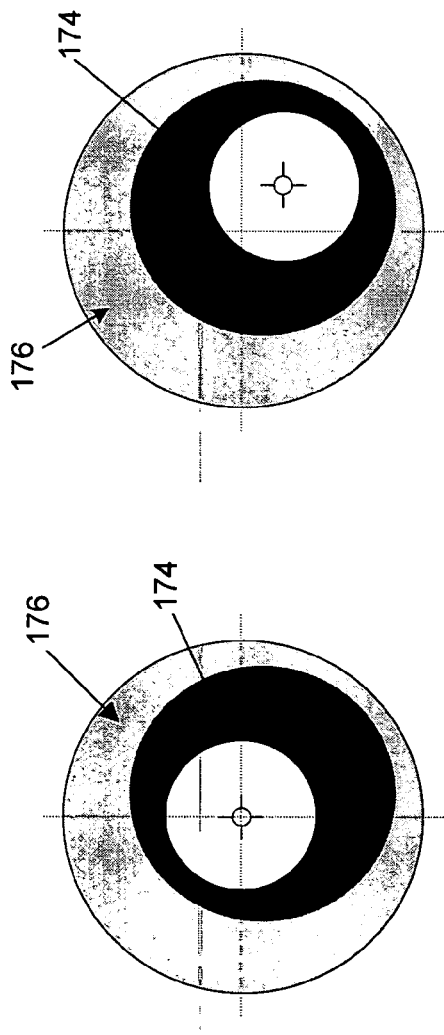
Fig. 7a (Related Art)
Fig. 7b (Related Art)
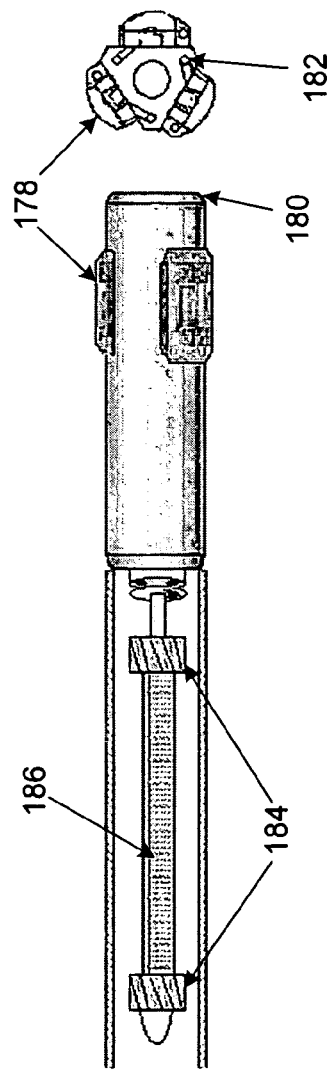
Fig. 8 (Related Art)

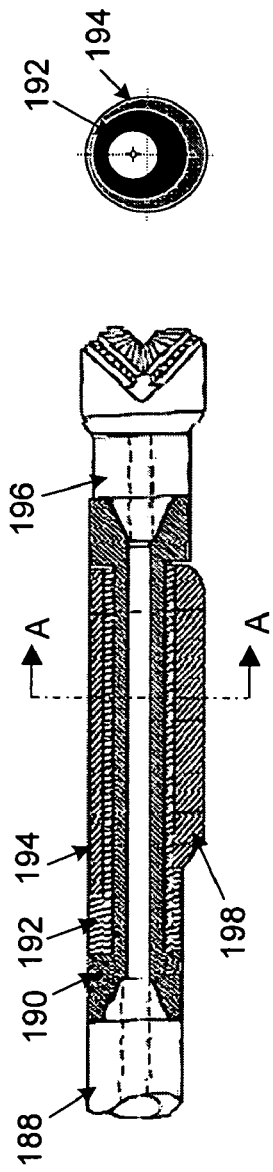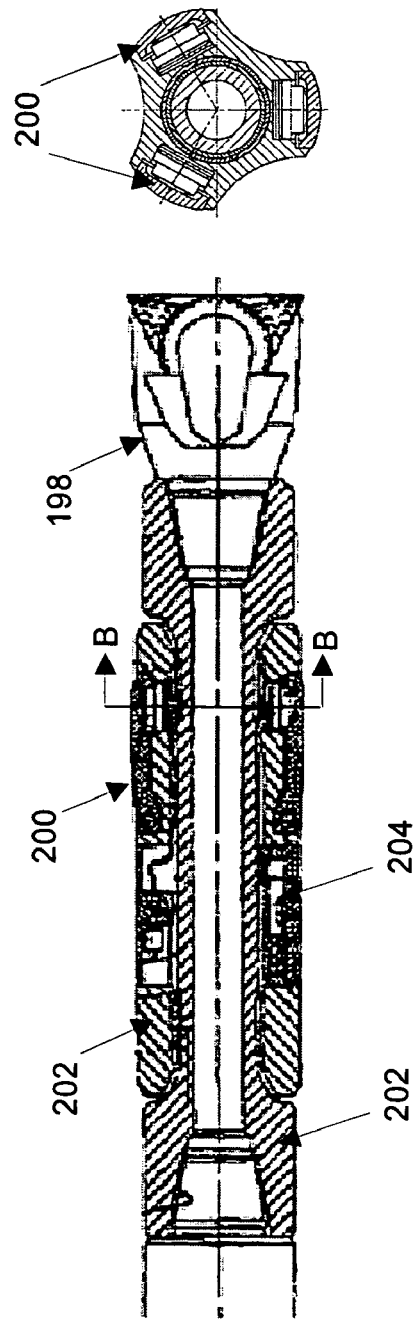
Fig. 9a (Related Art)
Fig. 9b (Related Art)
Fig. 10a (Related Art)
Fig. 10b (Related Art)

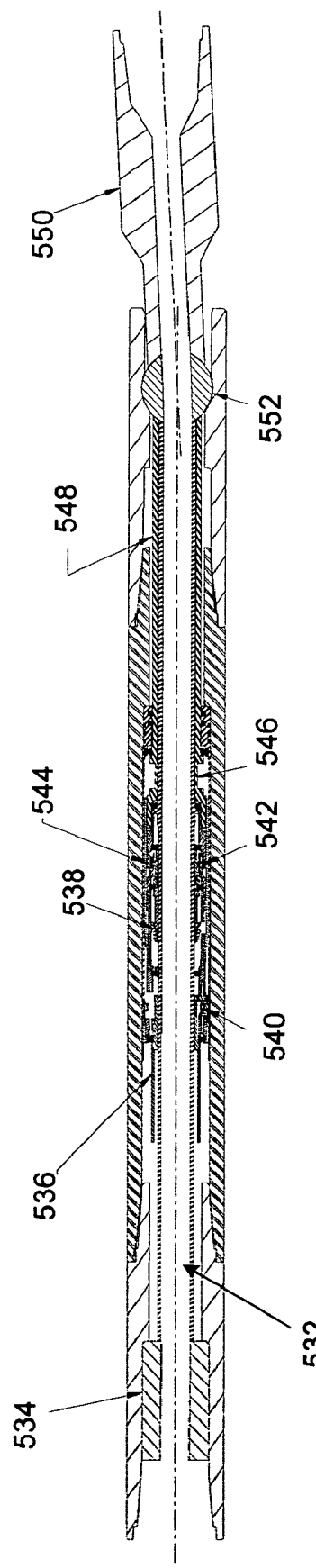

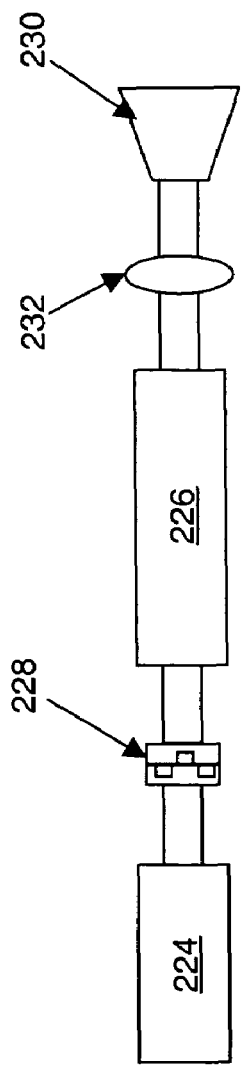
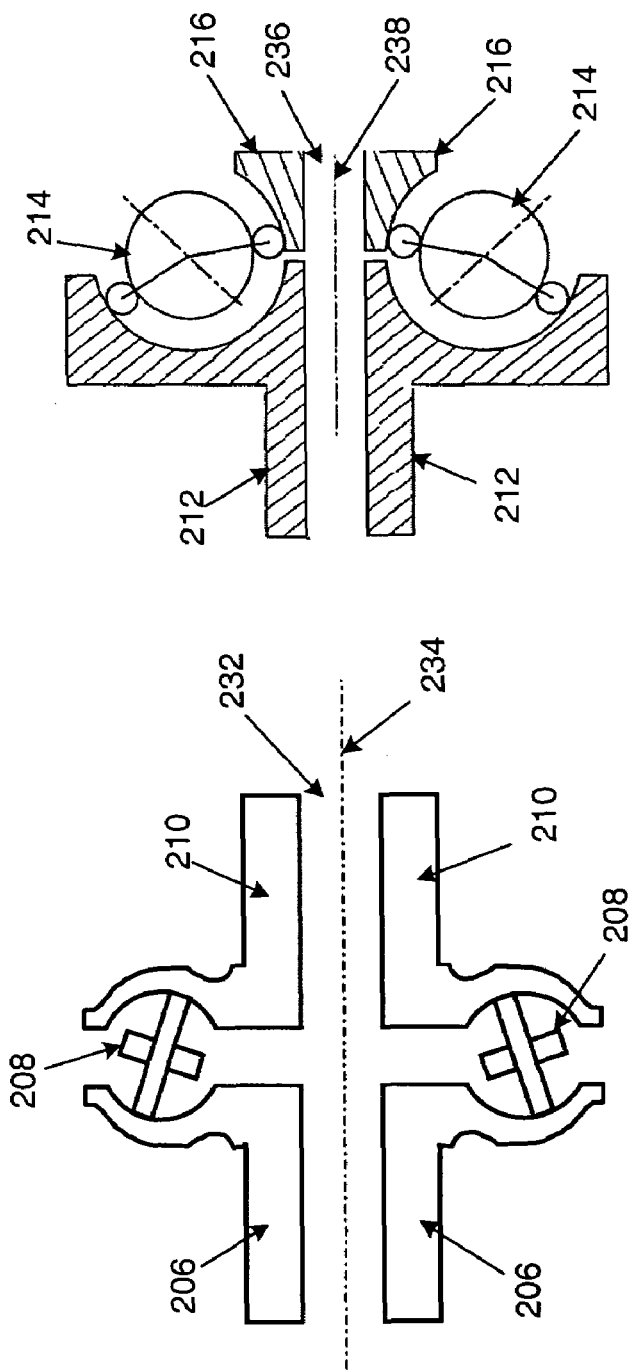
Fig. 15
Fig. 16
Fig. 17

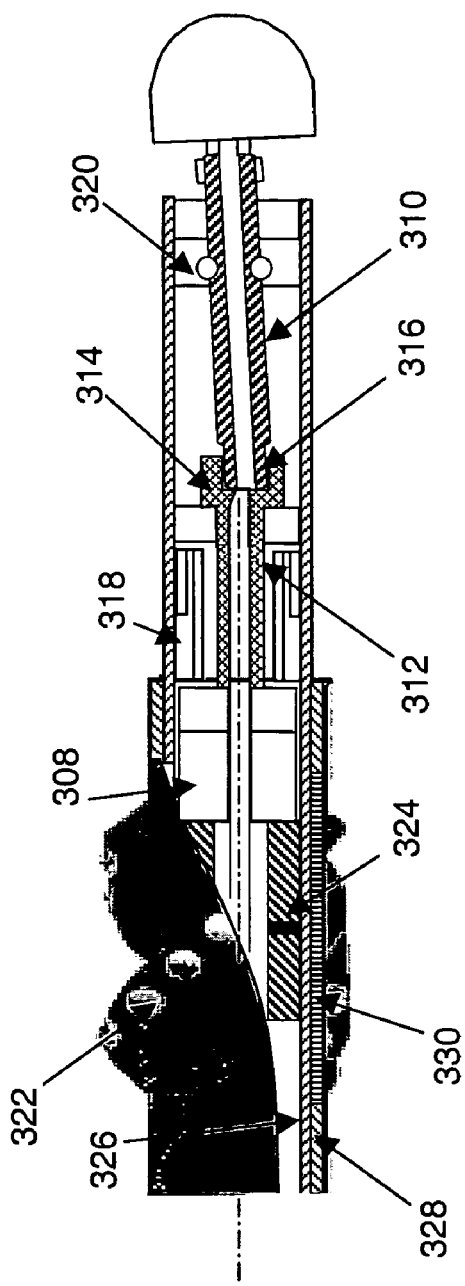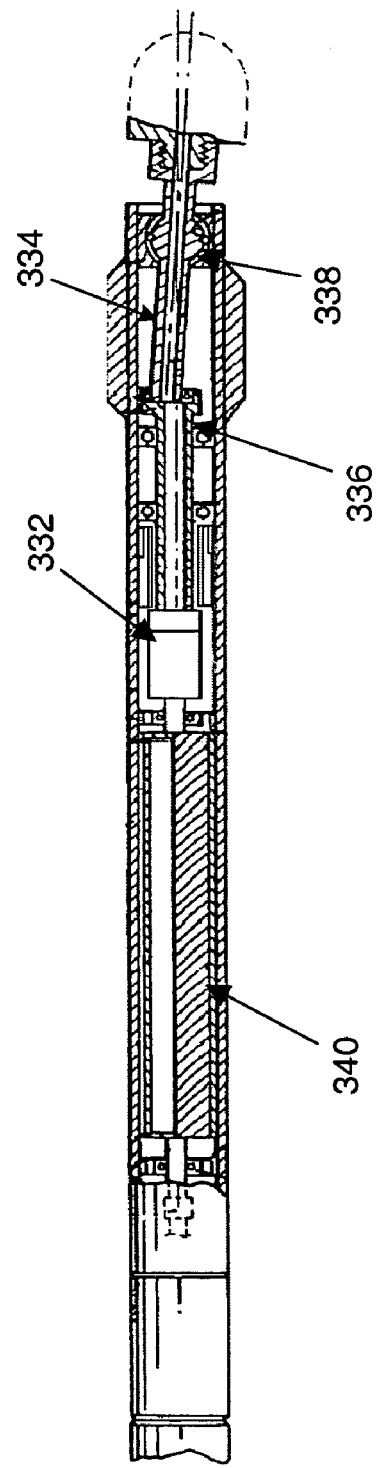
Fig. 23
Fig. 24

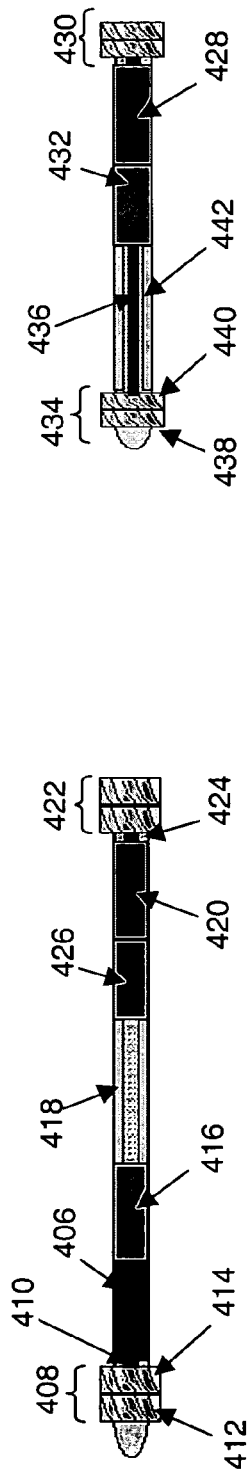
Fig. 29
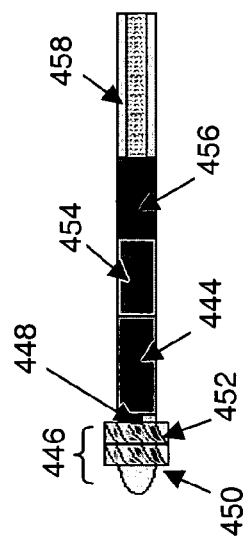
Fig. 30
Fig. 31
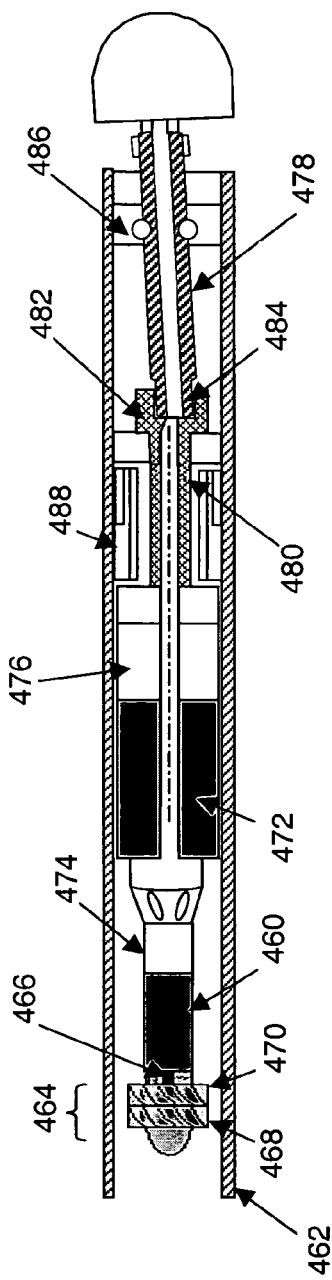
Fig. 32

SYSTEMS AND METHODS FOR THE DRILLING AND COMPLETION OF BOREHOLES USING A CONTINUOUSLY VARIABLE TRANSMISSION TO CONTROL ONE OR MORE SYSTEM COMPONENTS

PRIORITY CLAIM

This application claims priority to U.S. Provisional Application No. 60/465,395 entitled "Rotary Steerable Device Utilizing Continuously Variable Transmissions for Use in Drilling Applications," filed Apr. 25, 2003.

BACKGROUND OF THE INVENTION

1. Field of the Invention

This invention generally relates to systems and methods for drilling and/or completing a borehole using a continuously variable transmission to control one or more system components. Certain embodiments relate to systems for drilling a borehole that include a continuously variable transmission for controlling rotation of one or more system components. Additional embodiments relate to systems for completing a borehole that include a continuously variable transmission for controlling rotation of one or more system components.

2. Description of the Related Art

The following descriptions and examples are not admitted to be prior art by virtue of their inclusion within this section.

As downhole tools for oilfield applications become more complex, the control systems for controlling these tools have also increased in complexity. Many downhole tools attempt to control relative rotation through various means including electric, mechanical and hydraulic means. Examples for controlling relative rotation in a borehole also include measurement techniques that are performed during drilling such as mud-pulse telemetry, rotary steerable drilling systems, orientation of devices on coiled tubing, control of systems during casing while drilling, and in well completions. The systems themselves using direct or indirect control methods often form complicated clutching or servo-systems.

There are numerous issued U.S. Patents related to rotary steerable systems. One example of a rotary steerable system is the point-the-bit rotary steerable system. Several methods have been utilized to orient the axis of the bit in point-the-bit systems. Two common methods include deflecting a pipe and using universal joints.

One example of a point-the-bit rotary steerable system that includes universal joints is illustrated in U.S. Pat. No. RE29,526 to Jeter, which is incorporated by reference as if fully set forth herein. Jeter describes deviating the axis of a bit with relation to the drillstring. The offset is controlled allowing it to be reasonably stationary (non-rotating) within the earth's reference frame. Jeter also describes utilizing a universal joint that allows the bit sub, which connects the drill bit to the drillstring, to pivot a limited amount in any direction relative to the drill pipe. In particular,. Jeter describes a universal connection for urging the bit sub to pivot in one direction thereby moving the axis of rotation of the bit out of alignment with the axis of rotation of the drill pipe to urge the bit to drill in a direction that will return the drillstring to the desired azimuthal direction and inclination. Jeter also describes allowing the axis of the lower member containing a bit to be offset with respect to the axis of the upper member and controlling the offset of the axis using fluid motors or cams.

Another example of a point-the-bit rotary steerable system that includes universal joints is illustrated in U.S. Pat. No. 5,113,953 to Noble, which is incorporated by reference as if fully set forth herein. Noble describes offsetting the axis of a bit-shaft with a universal joint and controlling the universal joint in relation to an earth reference frame to directionally drill. In addition, Noble describes utilizing an electric motor to provide control means.

An additional example of a point-the-bit rotary steerable system that includes universal joints is illustrated in U.S. Pat. No. 6,092,610 to Kosmala et al., which is incorporated by reference as if fully set forth herein. Kosmala et al. describe a universal joint system that is used to omni-directionally pivotally support a bit-shaft intermediate its upper and lower ends. In addition, the system described by Kosmala et al. includes a breaking device to provide controllability of the system. Kosmala et al. further describe the use of an electric motor coupled to a breaking mechanism to provide rotational control. A breaking mechanism is necessary when utilizing an electrical motor.

FIG. 1 provides an overview of an actively controlled rotary steerable system utilizing an electric motor described by Kosmala et al. System 26 includes tubular collar 32 coupled to threaded section 34, which allows connection to the drillstring. Sensor support section 40 is disposed within the tubular collar. Potential electronics system 41 such as a resistivity measurement system may be included within the sensor support section. In addition, sensor support section 40 may include receptacle 42 for housing magnetometers, accelerometers, and other electronics. The system may also include fluid energized turbine 48, which includes turbine stator 50. Turbine rotor 52 is coupled by turbine rotor output shaft 54 to the rotor of alternator 56. As further shown in FIG. 1, the system also includes transmission 58, electric motor 60, gearbox or transmission 61 that is driven by the motor, offsetting mandrel 62, rotary drive head 64 that contains eccentrically located positioning receptacle 66, which receives driven end 68 of bit shaft 70, and pivoting universal joint 72. As the turbine rotates, the alternator converts the rotary energy into electrical power utilized in electric motor 60. The electric motor provides a servo-control system for ensuring control of the offset created by universal joint 72 located between the tubular collar and the bit shaft.

It is noted that in the system described by Kosmala et al. the turbine rotor rotation rate is not controlled by the rotary steerable system, but is determined by fluid flow in the drilling system. This uncontrolled rotation is utilized to create power to rotate the electric motor. The motor's rotation is controlled through the use of a servo-control system.

Another example of a steerable drilling tool and system is illustrated in U.S. Pat. No. 5,617,926 to Eddison et al., which is incorporated by reference as if fully set forth herein. A conceptual drawing of the system is shown in FIG. 2. The system described by Eddison et al. includes universal joint 74 that is similar to the universal joint described by Jeter. The universal joint described by Eddison et al. is coupled with internal eccentric mass 76, j-slot orientation control mechanism 78, and offset mandrel 80. Additional description of the system shown in FIG. 2 can be found in U.S. Pat. No. 5,617,926 to Eddison et al.

Major limitations with this design exist in the implementation of the control mechanism and the application of the torque supplied by the eccentric weight. The eccentric weight provides it maximum torque when its center of gravity is at 90 degrees to the gravity vector when projected onto the radial axis in the tools reference frame. When the system is operating within maximum torque requirements, the system orientation vector for the drive shaft can only be controlled within a given quadrant. The orientation itself is a function of the resultant forces on the bit-shaft and is not controllable. Therefore, the control mechanism provides only limited control of the bit shaft orientation. The system becomes unstable when the torque required to orient the bit shaft is greater than that which can be supplied by the eccentric weight. These problems can be resolved with the implementation of the novel orientation mechanism described herein.

An alternative to the point-the-bit rotary steerable system has been introduced into the drilling market, which includes pointing the bit through the deflection of a shaft. Control of the shaft deflection is accomplished by various means. U.K. Patent Application No. GB 2 177 738 by Douglas, et al. provides an overview of how the concept of shaft deflection may be used in rotary steerable systems.

One example of such a system is illustrated in FIG. 3. As shown in FIG. 3, the drilling system includes drill collar 82 within borehole 84 being drilled, two spaced stabilizers 86 and 88, and control stabilizer 90. Control stabilizer 90 does not rotate with the collar and includes an activation mechanism for applying a controlled lateral force or displacement on the drill collar. The force causes bending in the collar and angular deflection. 92 at bit 94. In other words, control stabilizer 90 applies to drill collar 82 a controlled lateral force or displacement (indicated by arrow 96) in order to deflect the latter between spaced supports 98 constituted by stabilizers 86 and 88. FIG. 3 illustrates the undeflected drill collar at 100 and the deflected drill collar at 102, the change in drilling direction being indicated by angle 92. Selective control of the activation mechanism force and direction relative to an earth's reference allows the system to provide steering control during the well drilling process.

Various control assemblies for shaft deflection have been designed to bend or deflect the drilling shaft laterally or radially within the housing. Several mechanisms for activation of the described directional biasing mechanism are described in U.K. Patent Application No. GB 2 177 738 by Douglas, et al. and U.S. Pat. No. 5,875,859 to Ikeda et al. and U.S. Pat. No. 6,244,361 to Comeau et al., which are incorporated by reference as if fully set forth herein.

The control mechanism described by Douglas et al. includes multiple actuators coupled to a non-rotating control stabilizer. As depicted in FIG. 4, an actuator assembly includes four individual actuators 104. These individual actuators 104 lie within annular space 106 between actuator casing 108 and actuator bridge member 110, and each actuator is disposed at equal intervals around the periphery. Individual actuators 104 create a force between casing 108 and actuator bridge member 110. The actuator bridge member resolves the relative rotation issues between the actuators and the shaft to be deflected. Douglas et al. envisioned the individual actuators to be flexible hydraulic tubes, which would be independently controlled to produce a specific output vector (magnitude and direction) at the shaft endpoint.

Ikeda et al. and Comeau et al. describe shaft deflection assemblies that include eccentric rings. Ikeda et al. and Comeau et al. both utilize shaft deflection to implement point-the-bit systems. The systems of Ikeda et al. and Comeau et al. differ from one another in the aspect of the drilling shaft assembly. While Comeau et al. utilizes a deflected shaft, the system proposed by Ikeda et al. contains a universal joint at the point of greatest stress in the shaft. This allows the system to bend without cyclically fatiguing the shaft. These differences are visible in FIGS. 5 and 6, which are taken from the patents issued to Ikeda et al. and Comeau et al, respectively. FIG. 5 illustrates the deflection and control mechanism described by Ikeda et al. FIG. 6 illustrates the deflection and control mechanism described by Comeau et al.

As shown in FIG. 5, the mechanism described by Ikeda et al. includes upper rotating shaft 112 for rotary drilling equipment and lower rotating shaft 114, which is connected to the upper rotating shaft and flexible joint 116. The mechanism also includes drill collar 118, which is co-axially connected to the distal end portion of lower rotating shaft 114 and drill bit 120, which is secured at the distal end of drill collar 118. Furthermore, upper rotating shaft 112 is connected to a rotating driving mechanism (not shown).

In addition, the mechanism includes cylinder-type housing 122, which encloses an outer peripheral surface of upper and lower rotating shafts 112 and 114 above drill collar 118 and lower sealing equipment 124, which is provided between the distal end portion of cylinder-type housing 122 and lower rotating shaft 114. The system shown in FIG. 5 also includes fulcrum bearing 126, which is located between cylinder-type housing 122 of lower sealing equipment 124 and lower rotating shaft 114 and receives the load from drill bit 120, double eccentric mechanism 128, which is mounted between cylinder type housing 122 above fulcrum bearing 126 and lower rotating shaft 114, cylinder-type component 130, which is fixed on an inner peripheral surface of cylinder type housing 122, first rotatable ring-formed component 132, which is located inside cylinder type component 130 and second ring-formed component 134, which is rotatably deposited inside the first ring-formed component.

The system shown in FIG. 5 further includes first harmonized reduction gear 136 which rotates first ring-formed component 132 located right above double eccentric mechanism 128, second harmonized reduction gear 138, which rotates second ring-formed component 134 being provided right below double eccentric mechanism 128, bearing 140 which supports the lower portion of upper rotating shaft 112, and upper seal 142 which is provided between the upper portion of cylinder type housing 122 and upper rotating shaft 112. The mechanism shown in FIG. 5 may be further configured as described in U.S. Pat. No. 5,875,859 to Ikeda et al.

As shown in FIG. 6, the mechanism of Comeau et al. includes drilling direction control device 144, which permits directional control over drilling bit 146 connected within the device during rotary drilling operations by controlling the orientation of the drilling bit. Drilling direction control device 144 includes rotatable drilling shaft 148, which is connectable or attachable to rotary drilling string 150 during the drilling operation. Housing 152 rotatably supports a length of drilling shaft 148 for rotation therein upon rotation of the attached drilling string 150. Device 144 also includes at least one distal radial bearing 154 and at least one proximal radial bearing 156. Each of the radial bearings 154 and 156 is contained within housing 152 for rotatably supporting the drilling shaft 148 radially at the location of that particular radial bearing. Distal radial bearing 154 preferably includes fulcrum bearing 158.

Preferably, device 144 further includes near bit stabilizer 160, which in the preferred embodiment is located adjacent to the distal end of housing 152 and coincides with the distal radial bearing location. Furthermore, device 144 includes drilling shaft deflection assembly 162, which may be located axially at any location or position between the distal end and the proximal end of the housing. Deflection assembly 162 is provided for bending drilling shaft 148 between the distal radial bearing location and the proximal radial bearing location. The device also includes at least distal thrust bearing 164 and at least one proximal thrust bearing 166. Each of the thrust bearings is contained within housing 152 for rotatably supporting drilling shaft 148 axially at the location of that particular thrust bearing. As a result of the thrust bearings, most of the weight on the drilling bit may be transferred into and through housing 152 as compared to through the drilling shaft of the device.

Device 144 also includes anti-rotation device 168 associated with housing 152 for restraining rotation of housing 152 within the wellbore upon rotary drilling. Preferably, the device further includes a distal seal or sealing assembly 170 and a proximal seal or sealing assembly 172. Distal seal 170 is radially positioned and provides a rotary seal between housing 152 and drilling shaft 148 at, adjacent or in proximity to the distal end of housing 152. Proximal seal 172 is radially positioned and provides a rotary seal between housing 152 and drilling shaft 148 at, adjacent or in proximity to the proximal end of housing 152. Additional details of the mechanism shown in FIG. 6 can be found in U.S. Pat. No. 6,244,361 to Comeau et al.

The control mechanisms described by Ikeda et al. and Comeau et al. include shaft deflection assemblies that include eccentric rings, as shown in FIGS. 7a and 7b. This type of assembly is known in the art. The assembly includes two eccentric rings, inner ring 174 and outer ring 176, which are capable of relative rotation. Relative rotation between the two eccentric rings results in a relative displacement between the center of the outer ring and the center of the inner ring. The system can be designed such that at 0 degrees of rotation, the centers of the two eccentric rings coincide, as shown in FIG. 7a. The rings have a maximum displacement between their centers at 180 degrees of relative rotation, as shown in FIG. 7b. Such a system provides the ability to impart a controlled deflection on the drilling shaft at the location of the assembly.

Both systems utilize harmonic drives to control the orientation of the eccentric ring systems. A harmonic drive is required for each ring. The drive system takes power from the relative rotation between the non-rotating sleeve and the drive shaft.

Push-the-bit rotary steerable systems utilize side force on near-bit assemblies to provide a deviation mechanism. Variations on the concept fall into two categories: synchronous systems and non-rotating systems.

Synchronous rotary drilling systems are illustrated in U.S. Pat. No. 5,265,682 to Russell et al., which is incorporated by reference as if fully set forth herein. One system described by Russell et al. includes a modulated bias unit, which is used to control the direction of the drilling assembly, and a control unit for modulating such bias unit. FIG. 8 provides a conceptual overview of the synchronous push-the-bit system. The bias unit includes hydraulic actuators 178 spaced apart around the periphery of the unit proximate bit connector 180 and a selector control valve (not shown). The selector control valve is coupled to hydraulic actuators 178 by hydraulic ports 182. Each actuator is capable of providing a force and outward displacement against the formation. The selector control valve modulates the fluid. pressure supplied to each actuator in synchronism with rotation of the drill bit so that, as the drill bit rotates, each movable thrust member is displaced at the same selected rotational position. This displacement of the movable thrust members causes a constant relative thrust at a radial point in the borehole. The control valve includes two disks. One disk contains a port for each of the actuators. The second disk is rotationally controlled by the control sub to selectively activate each actuator at the prescribed position.

The control system for the synchronous system utilizes a downhole instrumentation package, which is roll stabilized with respect to the drillstring. Mounted impellers 184 rotate relative to the drill collar as a result of fluid flow. The impellers are mounted such that their relative rotation is in opposite directions. Control sub 186 is also mounted to the housing through bearings allowing for relative rotation. The impellers impart a controlled torque against the control sub housing through a clutching mechanism such as an electromagnetic clutch. Controlling the torque imparted by each impeller allows for the control sub to be rotationally controlled and non-rotating with respect to an earth reference frame.

A second group of push-the-bit systems exist that include non-rotating stabilizers. A side force is applied to the formation through a non-rotating assembly. Examples of such systems are illustrated in U.S. Pat. No. 5,979,570 to McLoughlin et al. and European Patent Application No. 0 744 526 by Oppelt et al., which are incorporated by reference as if fully set forth herein. FIGS. 9a and 9b are schematic diagrams illustrating a push-the-bit system utilizing a non-rotating sleeve and eccentric rings. FIGS. 10a and 10b are schematic diagrams illustrating a push-the-bit system utilizing a non-rotating sleeve and hydraulic action.

As shown in FIG. 9a, this push-the-bit system is attached to adapter sub 188, which would in turn be attached to the drill string (not shown). The adapter sub is attached to inner rotatable mandrel 190 and may not be necessary if the drill string pipe threads match the device threads. This mandrel is free to rotate within inner eccentric sleeve 192. Inner eccentric sleeve 192 may be turned freely within an arc by a drive means (not shown) inside the outer eccentric housing or mandrel 194, as shown in FIGS. 9a and 9b.

As further shown in FIG. 9a, inner rotating mandrel 190 is shown as being attached directly to drill bit 196. Outer housing 194 consists of a bore passing longitudinally through the outer sleeve which accepts the inner sleeve. The outer housing is eccentric on its outside clearly shown as "pregnant" portion 198. The pregnant portion or weighted side 198 of the outer housing forms the heavy side of the outer housing and is manufactured as a part of the outer sleeve. The pregnant housing contains the drive means for controllably turning the inner eccentric sleeve within the outer housing. Additionally, the pregnant housing may contain logic circuits, power supplies, hydraulic devices, and the like which are (or may be) associated with the "on demand" turning of the inner sleeve. Additional details of the system shown in FIGS. 9a and 9b can be found in U.S. Pat. No. 5,979,570.

As shown in FIGS. 10a and 10b, this push-the-bit system includes bit 198 coupled to hydraulic actuator assembly 200. The hydraulic actuator assembly is coupled to non-rotating sleeve assembly 202. The hydraulic actuator assembly may be configured such that a side force can be selectively applied to a formation (not shown) through non-rotating sleeve assembly 202. The amount and direction of the side force will vary depending on the direction in which drilling is desired. The amount and direction of the side force that is applied to the formation may be controlled by hydraulic control assembly 204, which is coupled to hydraulic actuator assembly 200. Additional details of the system shown in FIGS. 10a and 10b can be found in European Patent Application No. 0 744 526 A1.

Rotary steerable systems all attempt to control the rotation of specific system components relative to an earth reference frame (gravity, magnetic vector, etc.). This attempt to control relative rotation is analogous to the control sought in other systems with specific types of transmission known as continuously variable transmissions (CVTs).

Continuously variable transmissions (CVTs) have existed for over 100 years. However, they are only today beginning to see widespread use as a fuel-saving technology in the automotive industry. For example, the technology was first introduced in 1886, but its practical automotive merits were not fully realized until Honda installed a CVT in its 1996 Civic HX.

Some light-weight automobiles are already using CVTs in which power is transferred by a belt in contact with one or more pulleys. However, CVTs that use belts (or sometimes chains) are limited to fairly light vehicles, usually those weighing under about 2,000 pounds. For example, the Ford Festiva and the Subaru Justy use a CVT. In the light passenger vehicles they are now being used in, CVTs provide high efficiency and thus boost fuel mileage while reducing emissions.

SUMMARY OF THE INVENTION

The present invention relates to the design of a new drilling system controlled by mechanical continuously variable transmissions (CVTs). CVTs may also be commonly referred to as "continuous velocity transmissions." A variety of implementations of CVTs are found including infinitely variable transmissions (IVT), traction drives, etc. As used herein, the term CVT generally refers to any transmission for transforming relative rotation rates including CVTs, IVTs, and traction drives.

One embodiment relates to a system configured for drilling a borehole. The system includes a CVT. An input shaft of the CVT is coupled to a power supply. An output shaft of the CVT is coupled to one or more system components such that the CVT controls rotation of the one or more system components. In one embodiment, a transmission ratio of the CVT is varied depending on one or more characteristics selected for the borehole. In another embodiment, a transmission ratio of the CVT is varied depending on one or more characteristics of a formation in which the borehole will be drilled. In an additional embodiment, the CVT may be configured as an IVT.

In some embodiments, the CVT may include mechanical elements for controlling the rotation of the one or more system components. In one particular embodiment, the CVT may include conical elements. Relative rotation of the conical elements controls the rotation of the one or more system components. In another embodiment, the CVT may include spherical elements. In such an embodiment, relative rotation of the spherical elements controls the rotation of the one or more system components. In a different embodiment, the CVT may include disk elements, and relative rotation of the disk elements controls the rotation of the one or more system components. In a further embodiment, the CVT may include toroidal elements. In this embodiment, relative rotation of the toroidal elements controls the rotation of the one or more system components. In some embodiments, the CVT includes one or more belts coupled to pulley elements. An effective diameter of the pulley elements controls the rotation of the one or more system components. In other embodiments, the CVT may include a gear and tooth assembly that couples control arms to mechanical elements of the CVT. Translation of the control arms is converted to rotation of the mechanical elements, and relative rotation of the mechanical elements controls the rotation of the one or more system components.

In one embodiment, the output shaft of the CVT may be coupled to the one or more system components by a mandrel. In another embodiment, the CVT may include a central cylinder traversing its longitudinal axis. The central cylinder may be configured such that drilling fluid can flow through the central cylinder.

In some embodiments, the system may also include a control subsystem coupled to the CVT. In one such embodiment, the control subsystem may include an electrical subsystem that is configured to alter one or more parameters of the CVT. In another embodiment, the control subsystem may include an electromagnetic subsystem that is configured to alter one or more parameters of the CVT. In a different embodiment, the control subsystem may include a mechanical subsystem that is configured to alter one or more parameters of the CVT. In yet another embodiment, the control subsystem may include a hydraulic subsystem that is configured to alter one or more parameters of the CVT. In other embodiments, the control subsystem may include some combination of an electrical subsystem, an electromagnetic subsystem, a mechanical subsystem, and a hydraulic subsystem that is configured to alter one or more parameters of the CVT. In some embodiments, the control subsystem may be configured to actively alter one or more parameters of the CVT. In a different embodiment, the control subsystem may be configured to passively alter one or more parameters of the CVT.

In one embodiment, the input shaft of the CVT may be coupled directly to the power supply. In other embodiments, the input shaft of the CVT may be coupled indirectly to the power supply. In some embodiments, the power supply may be generated by relative rotation between elements of the system or between one or more elements of the system and a formation in which the borehole is being drilled. In other embodiments, the power supply may include a turbine assembly, an electric motor, a positive displacement motor (PDM), or a turbine assembly in combination with a PDM.

Some embodiments of the system also include a fixed gear ratio device coupled to the CVT. The fixed gear ratio device is configured to provide increased control of a transmission ratio of the CVT. Other embodiments of the system include a harmonic drive coupled to the CVT. Like the fixed gear ratio device, the harmonic drive is configured to provide increased control of a transmission ratio of the CVT.

In one embodiment, the system may include conveyance means configured to move the CVT, power supply, and one or more system components. The conveyance means may include wireline, coiled tubing, a drill string, casing while drilling means, self propelled means, or any other conveyance means known in the art.

In some embodiments, the system may be configured as a rotary steerable system.

In an additional embodiment, the system may be configured as a measuring-while-drilling (MWD) system. In other embodiments, the system may include an adjustable stabilizer. In some embodiments, the system may include a biasing subsystem. In another embodiment, the biasing subsystem may be configured to rotationally position the one or more system components. In a different embodiment, the biasing subsystem may be configured to axially position the one or more system components. In one such embodiment, the one or more system components may be coupled to a ball screw. In some embodiments, the system may also be configured to drill at an angle to the borehole using a deflecting tool (e.g., a whipstock). Each of the embodiments of the system described above may be further configured as described herein.

Another embodiment relates to a method for drilling a borehole. The method includes supplying power to an input shaft of a CVT. The method also includes controlling rotation of one or more system components using the CVT during drilling of the borehole. The one or more system components are coupled to an output shaft of the CVT. In some embodiments, the method may include altering a transmission ratio of the CVT depending on one or more characteristics selected for the borehole. In another embodiment, the method may include altering a transmission ratio of the CVT depending on one or more characteristics of a formation in which the borehole is being drilled.

In one embodiment, the method may also include altering one or more parameters of the CVT electrically, electromagnetically, mechanically, hydraulically, or some combination thereof during the drilling. In another embodiment, the method may include actively altering one or more parameters of the CVT during the drilling. Alternatively, the method may include passively altering one or more parameters of the CVT during the drilling. In some embodiments, the CVT may be configured as an IVT. Each embodiment of the method described above may include any other step(s) described herein. An additional embodiment relates to a borehole drilled by any of the embodiments of the method described herein.

Another embodiment relates to a system configured to complete a well. This system also includes a CVT. An input shaft of the CVT is coupled to a power supply. An output shaft of the CVT is coupled to one or more completion tool components such that the CVT controls rotation of the one or more completion tool components. In one embodiment, the system may also be configured to orient downhole equipment within a borehole of the well to connect a latch for use in drilling of multi-lateral wells. In another embodiment, the system may be configured to orient downhole equipment in a borehole of the well to position sensors within the borehole or to open or close a control component (e.g., a valve) of the system.

In some embodiments, the CVT may be configured to control relative rotation of a downhole pump to operate the pump at maximum efficiency and optimal rotation rate for fluids being pumped. In an additional embodiment, the system may be configured to convert the rotation to axial movement along a length of a pipe using a ball screw. In one such embodiment, the axial movement may position the one or more completion tool components axially within a borehole of the well. The one or more completion tool components may include control elements, sensors, valves, or some combination thereof. Each of the embodiments of the system may be further configured as described herein.

A further embodiment relates to a method for completing a well. The method includes supplying power to an input shaft of a CVT. The method also includes controlling rotation of one or more completion tool components using the CVT during completion of the well. The one or more completion tool components are coupled to an output shaft of the CVT. In one embodiment, the method may also include orienting downhole equipment within a borehole of the well to connect a latch for use in drilling of multi-lateral wells. In another embodiment, the method may include orienting downhole equipment in a borehole of the well to position sensors within the borehole or to open or close a control component (e.g., a valve) of the system.

In some embodiments, the method may include controlling relative rotation of a downhole pump using the CVT to operate the pump at maximum efficiency and optimal rotation rate for fluids being pumped. In an additional embodiment, the method may include converting the rotation to axial movement along a length of a pipe using a ball screw. The axial movement may position the one or more completion tool components axially within a borehole of the well in one embodiment. The one or more completion tool components may include control elements, sensors, valves, or some combination thereof. Each embodiment of the method may include any other step(s) described herein. Another embodiment relates to a well completed by any of the embodiments of the methods described above.

An additional embodiment relates to a system configured to directionally drill a borehole. The system includes a biasing subsystem configured to control a tendency of a bottom hole assembly during drilling of the borehole. The system also includes a CVT. An output shaft of the CVT is coupled to the biasing subsystem such that the CVT is configured to control relative rotation of one or more components of the biasing subsystem during the drilling. In some embodiments, the CVT may be configured as an IVT. In one embodiment, the system may be configured as a MWD system.

In another embodiment, the system may be configured as a rotary steerable system. In some embodiments, the biasing subsystem is configured to control the tendency of the bottom hole assembly in two dimensions. In other embodiments, the biasing subsystem is configured to control the tendency of the bottom hole assembly in three dimensions. In one embodiment, the biasing subsystem includes an adjustable stabilizer. In another embodiment, the biasing subsystem may include an orienter that is conveyed on coiled tubing. In some embodiments, the biasing subsystem is configured to rotationally position the bottom hole assembly. In other embodiments, the biasing subsystem is configured to axially position the bottom hole assembly. In one such embodiment, one or more system components are coupled to a ball screw. In one embodiment, the biasing subsystem may be configured as a push-the-bit system. In other embodiments, the biasing subsystem may be configured as a point-the-bit system.

In one embodiment, the CVT may include a mechanical CVT. In a different embodiment, the CVT may include an electrical CVT. In another embodiment, the CVT may include a single stage CVT. In other embodiments, the CVT may include a multiple stage CVT. A transmission ratio of the CVT may be varied depending on one or more characteristics selected for the borehole. Alternatively, a transmission ratio of the CVT may be varied depending on one or more characteristics of a formation in which the borehole will be drilled.

In an embodiment, the CVT may include mechanical elements for controlling the relative rotation of the one or more components of the biasing subsystem. In one embodiment, the CVT may include conical elements. Relative rotation of the conical elements controls the relative rotation of the one or more components. In another embodiment, the CVT may include spherical elements. In such an embodiment, relative rotation of the spherical elements controls the relative rotation of the one or more components. In a different embodiment, the CVT may include disk elements, and relative rotation of the disk elements controls the relative rotation of the one or more components. In yet another embodiment, the CVT may include toroidal elements, and relative rotation of the toroidal elements controls the relative rotation of the one or more components.

In some embodiments, the CVT may include one or more belts coupled to pulley elements. An effective diameter of the pulley elements controls the relative rotation of the one or more components. In a different embodiment, the CVT may include a gear and tooth assembly that couples control arms to mechanical elements of the CVT. Translation of the control arms is converted to rotation of the mechanical elements. Relative rotation of the mechanical elements controls the relative rotation of the one or more components. In some embodiments, the output shaft of the CVT is coupled to the one or more components by a mandrel. In another embodiment, the CVT includes a central cylinder traversing its longitudinal axis. The central cylinder is configured such that drilling fluid can flow through the central cylinder.

In one embodiment, the system also includes a control subsystem coupled to the CVT. In one such embodiment, the control subsystem includes an electrical subsystem that is configured to alter one or more parameters of the CVT. In a different embodiment, the control subsystem includes an electromagnetic subsystem that is configured to alter one or more parameters of the CVT. In another embodiment, the control subsystem includes a mechanical subsystem that is configured to alter one or more parameters of the CVT. In other embodiments, the control subsystem may include a hydraulic subsystem that is configured to alter one or more parameters of the CVT. In some embodiments, the control subsystem may include some combination of an electrical subsystem, an electro-magnetic subsystem, a mechanical subsystem, and a hydraulic subsystem, the combination of which is configured to alter one or more parameters of the CVT. In one embodiment, the control subsystem is configured to actively alter one or more parameters of the CVT. In another embodiment, the control subsystem is configured to passively alter one or more parameters of the CVT.

In an additional embodiment, the subsystem includes a power supply coupled to the CVT. In one such embodiment, an input shaft of the CVT is coupled directly to the power supply. In a different embodiment, an input shaft of the CVT is coupled indirectly to the power supply. In one embodiment, the power supply is generated by relative rotation between elements of the system or between one or more elements of the system and a formation in which the borehole is being drilled. In another embodiment, the power supply is generated by relative rotation between a non-rotating sleeve and a drive shaft. In some embodiments, the power supply may include a turbine assembly. In other embodiments, the power supply may include an electric motor. In a different embodiment, the power supply includes a PDM. In an alternative embodiment, the power supply includes a turbine assembly in combination with a PDM.

In some embodiments, the system may also include a fixed gear ratio device coupled to the CVT. The fixed gear ratio device is configured to provide increased control of a transmission ratio of the CVT. In other embodiments, the system may include a harmonic drive coupled to the CVT. In such embodiments, the harmonic drive is configured to provide increased control of a transmission ratio of the CVT.

In some embodiments, the coupling of a fixed gear ratio device to a CVT can result in an IVT. An IVT design provides for an infinite gear ratio. An IVT can impart no rotation on an output shaft with rotation present at the input shaft.

In one embodiment, the system may include conveyance means configured to move the biasing subsystem and the CVT. The conveyance means may include wireline, coiled tubing, a drill string, casing while drilling means, self propelled means, or any other conveyance means known in the art. Each of the embodiments of the system described above may be further configured as described herein.

A further embodiment relates to a method for directionally drilling a borehole. The method includes controlling a tendency of a bottom hole assembly during drilling of the borehole using a biasing subsystem. Controlling the tendency may include controlling the tendency of the bottom hole assembly in two or three dimensions. In addition, controlling the tendency may include axially or rotationally positioning the bottom hole assembly.

In one embodiment, the biasing subsystem is configured as a rotary steerable system. In some embodiments, the biasing subsystem may include an adjustable stabilizer. In another embodiment, the biasing subsystem may include an orienter conveyed on coiled tubing. In one embodiment, the biasing subsystem is configured as a push-the-bit system. In another embodiment, the biasing subsystem is configured as a point-the-bit system.

The method also includes controlling relative rotation of one or more components of the biasing subsystem using a CVT during the drilling. The one or more components are coupled to an output shaft of the CVT. In some embodiments, the CVT may be configured as an IVT. In one embodiment, the method also includes altering a transmission ratio of the CVT depending on one or more characteristics selected for the borehole. In another embodiment, the method includes altering a transmission ratio of the CVT depending on one or more characteristics of a formation in which the borehole is being drilled. In some embodiments, the method may include altering one or more parameters of the CVT electrically, electro-magnetically, mechanically, hydraulically, or some combination thereof during the drilling of the borehole. In one embodiment, the method includes actively altering one or more parameters of the CVT during the drilling. In another embodiment, the method includes passively altering one or more parameters of the CVT during the drilling. Each embodiment of the method described above may include any other step(s) described herein. An additional embodiment relates to a borehole drilled by any of the embodiments of the method described herein.

The systems described herein provide a low cost and reliable control system for use with point-the-bit or push-the-bit rotary steerable drilling systems. CVTs are a class of transmission, which allows non-regulated rotation to be controlled and governed into regulated rotation. The solution provides a system that is much less complicated, less expensive, and more reliable than existing systems on the market. The same mechanical CVT can be utilized in mud-pulse telemetry applications to provide similar benefits of low cost and improved reliability.

One embodiment relates to a system that is configured to perform mud-pulse telemetry. The system includes a modulator and a mechanical CVT coupled to the modulator. The CVT is configured to control the modulator. In one embodiment, the CVT is also configured to alter a frequency at which the modulator operates to modulate an acoustic or pressure wave telemetry signal. In another embodiment, the CVT is configured to control the modulator such that a rate of relative rotation of the modulator is substantially constant. In a further embodiment, the CVT may be configured to control a relative position of the modulator. The relative position can be a rotational position or can be converted to an axial position. In some embodiments, the CVT may be configured as an IVT.

In one embodiment, the modulator may be configured as a siren modulator. In another embodiment, the modulator may be configured as a relative rotation type modulator. In a different embodiment, the modulator may be configured as a positive pulse type modulator. In other embodiments, the modulator may be configured as a negative pulse type modulator. In some embodiments, the modulator may include a rotary valve to which the CVT is coupled. In one embodiment, the modulator may include a rotary valve that is configured to dump a portion of drilling fluid to an annulus. In a different embodiment, the modulator may include a rotary valve that is configured to block a portion of flow inside a drill string of the system. In another embodiment, the modulator may include a ball screw oscillator to which the CVT is coupled. In some embodiments, the modulator includes a valve that is configured to operate axially. In another embodiment, the modulator creates restriction in an orifice.

In some embodiments, the system may also include a rotational energy storage device coupled to the modulator through the CVT. Torque generated from the modulator is converted to kinetic energy that is stored in the rotational energy storage device. The rotational energy storage device is configured such that the stored energy can be used as a power supply for the CVT. In one such embodiment, the system may also include a control subsystem coupled to the CVT and the rotational energy storage device. The control subsystem is configured to control the CVT and to control rotation rates of the rotational energy storage device such that the rotational energy storage device rotates at rates that are within operating limits for the rotational energy storage device.

In one embodiment, the system also includes a biasing subsystem coupled to the CVT. In such an embodiment, the CVT may be configured to control relative rotation of one or more components of the biasing subsystem. In other embodiments, the system may include an additional CVT coupled to a biasing subsystem. The additional CVT is configured to control relative rotation of one or more components of the biasing subsystem. In one such embodiment, the biasing subsystem may be configured as a rotary steerable system. In another such embodiment, the system may include a rotational energy storage device coupled to the modulator through the CVT. As described above, torque generated from the modulator is converted to kinetic energy that is stored in the rotational energy storage device. However, in this embodiment, the rotational energy storage device is configured such that the stored energy can be used as a power supply for the CVT and the additional CVT.

In an embodiment, the CVT includes mechanical elements for controlling the modulator. In another embodiment, the CVT includes conical elements. Relative rotation of the conical elements controls the modulator. In a different embodiment, the CVT includes spherical elements. In such an embodiment, relative rotation of the spherical elements controls the modulator. In other embodiments, the CVT includes disk elements, and relative rotation of the disk elements controls the modulator. In alternative embodiments, the CVT includes toroidal elements, and relative rotation of the toroidal elements controls the modulator.

In some embodiments, the CVT may include one or more belts coupled to pulley elements. An effective diameter of the pulley elements controls the modulator. In one embodiment, the CVT includes a gear and tooth assembly that couples control arms to mechanical elements of the CVT. Translation of the control arms is converted to relative rotation of the mechanical elements. Relative rotation of the mechanical elements controls the modulator. In another embodiment, the CVT includes a central cylinder traversing its longitudinal axis. The central cylinder is configured such that drilling fluid can flow through the central cylinder.

In some embodiments, the system may also include a control subsystem coupled to the CVT. In one such embodiment, the control subsystem includes an electrical subsystem that is configured to alter one or more parameters of the CVT. In another such embodiment, the control subsystem includes an electromagnetic subsystem that is configured to alter one or more parameters of the CVT. In a different embodiment, the control subsystem includes a mechanical subsystem that is configured to alter one or more parameters of the CVT. In other embodiments, the control subsystem includes a hydraulic subsystem that is configured to alter one or more parameters of the CVT. In yet another embodiment, the control subsystem includes some combination of an electrical subsystem, an electromagnetic subsystem, a mechanical subsystem, and a hydraulic subsystem, the combination of which is configured to alter one or more parameters of the CVT. In one embodiment, the control subsystem is configured to actively alter one or more parameters of the CVT. In a different embodiment, the control subsystem is configured to passively alter one or more parameters of the CVT.

In one embodiment, the system also includes a power supply coupled to the CVT. For example, an input of the CVT may be coupled to the power supply, and an output of the CVT may be coupled to the modulator. In one such embodiment, an input shaft of the CVT is coupled directly to the power supply. In a different embodiment, an input shaft of the CVT is coupled indirectly to the power supply. In some embodiments, the power supply is generated by relative rotation between elements of the system or between one or more elements of the system and a formation in which the borehole is being drilled. In a different embodiment, the power supply is generated by relative rotation between a non-rotating sleeve and a drive shaft. In another embodiment, the power supply includes a turbine assembly. In an alternative embodiment, the power supply includes an electric motor. In other embodiments, the power supply may include a PDM. In yet another embodiment, the power supply includes a turbine assembly in combination with a PDM.

In one embodiment, the system also includes a fixed gear ratio device coupled to the CVT. The fixed gear ratio device is configured to provide increased control of a transmission ratio of the CVT. In a different embodiment, the system includes a harmonic drive coupled to the CVT. In this embodiment, the harmonic drive is configured to provide increased control of a transmission ratio of the CVT.

In one embodiment, the system may include conveyance means configured to move the CVT. The conveyance means may include wireline, coiled tubing, a drill string, casing while drilling means, self propelled means, or any other conveyance means known in the art.

In another embodiment, the system may be configured as a MWD. In one embodiment, the system includes a biasing subsystem. In another embodiment, the system may include an adjustable stabilizer. The biasing subsystem may be configured to rotationally position one or more system components. Alternatively, the biasing subsystem may be configured to axially position one or more system components. In one such embodiment, the one or more system components are coupled to a ball screw. In some embodiments, the system may be configured to drill at an angle to the borehole using a deflecting tool (e.g., a whipstock).

Another embodiment relates to a method for performing mud-pulse telemetry. The method includes controlling a modulator of a mud-pulse telemetry system using a CVT coupled to the modulator. In one embodiment, the method includes altering a frequency at which the modulator operates using the CVT to modulate an acoustic or pressure wave telemetry signal. In another embodiment, controlling the modulator includes controlling the modulator such that a rate of relative rotation of the modulator is substantially constant. In some embodiments, the method may include controlling a relative position of the modulator using the CVT. In one embodiment, the method includes converting torque generated from the modulator to kinetic energy, storing the kinetic energy, and using the stored kinetic energy as a power supply for the CVT.

Some embodiments of the method may include controlling relative rotation of one or more components of a biasing subsystem using the CVT. Other embodiments of the method may include controlling relative rotation of one or more components of a biasing subsystem using an additional CVT. In one such embodiment, the method may also include converting torque generated from the modulator to kinetic energy, storing the kinetic energy, and using the stored kinetic energy as a power supply for the CVT and the additional CVT. Each embodiment of the method described above may include any other step(s) described herein. An additional embodiment relates to a borehole drilled by any of the embodiments of the method described herein.

BRIEF DESCRIPTION OF THE DRAWINGS

Other objects and advantages of the invention will become apparent upon reading the following detailed description and upon reference to the accompanying drawings in which:

FIGS. 1 and 2 are schematic diagrams illustrating cross-sectional views of point-the-bit rotary steerable systems that utilize universal joints;

FIGS. 3-7b are schematic diagrams illustrating cross-sectional views of point-the-bit rotary steerable systems that utilize shaft deflection;

FIG. 8 is a schematic diagram illustrating a cross-sectional view of a push-the-bit rotary steerable system;

FIG. 9a is a schematic diagram illustrating a cross-sectional view of a push-the-bit rotary steerable system that includes non-rotating stabilizers;

FIG. 9b is a schematic diagram illustrating a cross-sectional view of the system of FIG. 9a when viewed along plane A;

FIG. 10a is a schematic diagram illustrating a cross-sectional view of a push-the-bit rotary steerable system that includes non-rotating stabilizers;

FIG. 10b is a schematic diagram illustrating a cross-sectional view of the system of FIG. 10a when viewed along plane B;

FIGS. 14c-14e are schematic diagrams illustrating cross-sectional side views of a system that includes a CVT coupled to planetary gears;

FIG. 15 is a schematic diagram illustrating a side view of a CVT controlled rotary steerable system;

FIG. 16 is a schematic diagram illustrating a cross-sectional view of a hollow disk toroidal CVT mechanism;

FIG. 17 is a schematic diagram illustrating a cross-sectional view of a ball toroidal CVT mechanism;

FIG. 23 is a schematic diagram illustrating a cross-sectional view of a CVT rotary steerable system design utilizing a non-rotating stabilizer as a rotational input;

FIG. 24 is a schematic diagram illustrating a cross-sectional view of a CVT rotary steerable system design utilizing a non-rotating eccentric mass as a rotational input;

FIG. 29 is a schematic diagram illustrating a cross-sectional view of a mud-pulse telemetry system;

FIG. 30 is a schematic diagram illustrating a cross-sectional view of a mud-pulse telemetry system in which a mechanical CVT mechanism replaces the ECVT servo-control system;

FIG. 31 is a schematic diagram illustrating a cross-sectional view of another embodiment of a mud-pulse telemetry system utilizing a CVT mechanism and a rotational energy storage device;

FIG. 32 is a schematic diagram illustrating a cross-sectional view of a combined mud-pulse telemetry and rotary steerable system;

Figure 4:
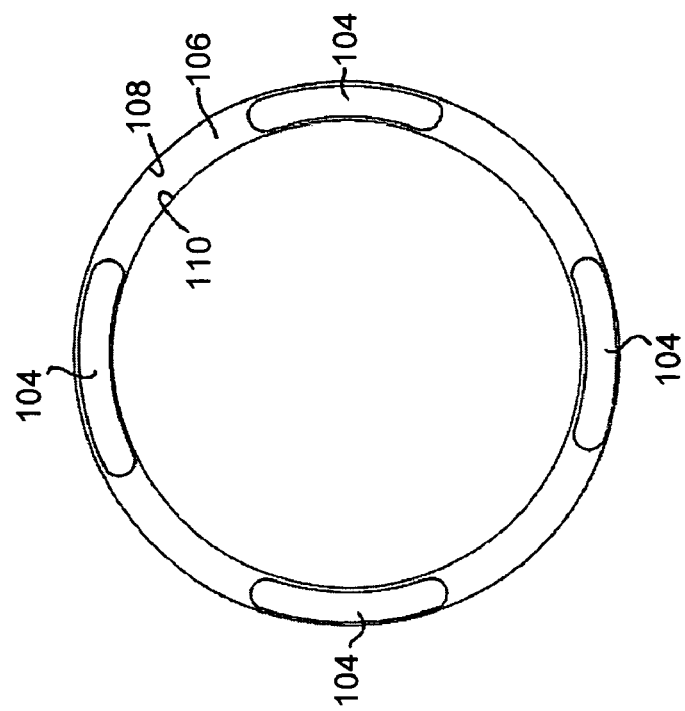
Figure 3:
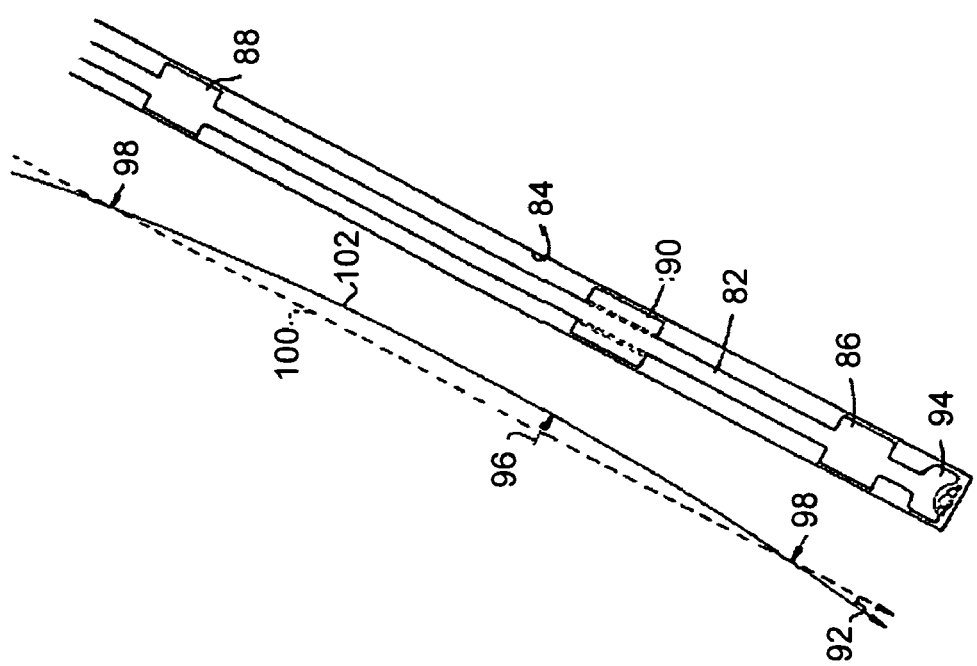

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that FIGS. 11-35 (as well as FIGS. 1-10 described above) are not drawn to scale. In particular, the scale of some of the elements of the figures is greatly exaggerated to emphasize characteristics of the elements. It is also noted that FIGS. 1-35 are not drawn to the same scale.

The following description generally relates to systems and methods that use continuously variable transmissions (CVTs) to control one or more components. For example, a system configured for drilling a borehole and/or completing a well may include a CVT. An input shaft of the CVT is coupled to a power supply, and an output shaft of the CVT is coupled to one or more system components such that the CVT controls the one or more system components. The one or more system components may include, but are not limited to, a bottom hole assembly, a bit shaft, another component coupled to the bottom hole assembly, one or more components of a biasing subsystem, one or more components of a measuring-while-drilling system, and a modulator of a mud-pulse telemetry system. In addition, the system may include conveyance means. The conveyance means may include wireline, coiled tubing, a drill string, casing while drilling means, self propelled means, or any other suitable conveyance means known in the art. Embodiments of such systems are described further herein and are illustrated in FIGS. 11-35.

In a system that uses a coiled tubing conveyance means, the coiled tubing does not rotate from the surface. Therefore, such systems include a downhole mud motor. In such embodiments, the CVT may be disposed between the coiled tubing and the mud motor. The CVT may be disposed above the mud motor, with the turbine disposed above the CVT. Alternatively, the CVT may be disposed between the mud motor power section and the biasing assembly. The CVT may control the biasing assembly and utilize the mud motor as a power supply. In one particular embodiment, the CVT may be coupled to a harmonic drive, both of which are disposed above the mud motor. The CVT may also control the rotation of the mud motor such that it rotates at relatively low rpm and at relatively high torque. These systems may be further configured as described herein.

A transmission is a device used to provide a set of discrete angular velocity outputs from a constant velocity source. A CVT generally serves the same function as a traditional transmission with the primary difference being that a CVT can produce an indiscrete range of outputs. The basic principle of most mechanical CVTs is that power transfer occurs by relative rotation of conical, spherical, disk or toroidal elements. Often, the power transfer occurs through frictional contact between two essentially smooth surfaces, rather than by toothed gears. CVTs can be commonly referred to using various other names including continuous velocity transmissions. Other implementations of CVTs include, but are not limited to, infinitely variable transmissions (IVT), traction drives, etc. As used herein, the term "CVT" generally refers to any continuously variable transmission configured for transforming relative rotation rates including CVTs, IVTs, and traction drives.

A significant advantage of a CVT stems from its ability to vary gear ratios while keeping an input power source at peak power and torque. In contrast, a traditional transmission must shift between multiple gears in attempting to keep a system in its prime operating zone. A CVT's continuously changing power ratio is much more efficient than stepping through a series of gears.

The CVT design is simple, yet effective. Rather than using a combination of gears, friction plates, hydraulic fluid, and a power-sapping torque converter, a CVT relies on simple relative rotation between elements to transfer rotation and torque. A simple CVT can be implemented with a belt-and-pulley design. The pulleys are generally cone-shaped, and the belt that runs between them can slide between the narrow and wide end of each pulley. This design allows for a "continuously variable" gear ratio because the effective diameter of the pulleys can vary over a wide range without a gear change.

More robust CVTs use balls, cones, disks, or toroidal (doughnut-shaped) elements rather than belts or chains. These types of CVTs are also used in snowmobiles, go-carts, and ATVs. Many designs for non-belt CVTs have been created. These mechanical CVT designs are based on relative rotation of conical, spherical, disks and/or toroidal elements. In the late 1930s General Motors obtained a patent for an automated ratio-controlled system for a toroidal traction drive, the first of a series of traction drive patents by GM research. Several additional types of traction drives were developed in the early 1950s by an American inventor, Charles Kraus. Various inventors from around the world are continuing to develop and perfect a wide variety of metal-to-metal lubricated traction drives, or CVTs, for adjustable-speed industrial, automotive, and aerospace applications. As an example, the transmission that provides all of the electrical power for the Harrier jet is a CVT roughly the size of a cantaloupe.

Examples of CVTs are illustrated in U.S. Pat. No. 4,342,238 to Gardner, U.S. Pat. No. 4,280,469 to Ganoung, U.S. Pat. No. 4,522,079 to Kemper, U.S. Pat. No. 4,589,859 to Kanesaka, U.S. Pat. No. 4,660,438 to Tatara, U.S. Pat. No. 4,735,598 to Moroto et al., U.S. Pat. No. 4,768,996 to Kumm, U.S. Pat. No. 4,922,788 to Greenwood, U.S. Pat. No. 5,421,790 to Lasoen, U.S. Pat. No. 5,514,047 to Tibbles et al., U.S. Pat. No. 5,662,547 to Moroto et al., U.S. Pat. No. 5,766,105 to Fellows et al., U.S. Pat. No. 5,846,152 to Taniguchi et al., U.S. Pat. No. 6,099,424 to Tsai et al., U.S. Pat. No. 6,196,806 to Van Der Sluis, U.S. Pat. No. 6,290,620 to Tsai et al.,. U.S. Pat. No. 6,321,613 to Avidor, U.S. Pat. No. 6,387,004 to Parrish, U.S. Pat. No. 6,390,945 to Young, U.S. Pat. No. 6,394,920 to Morlok,. U.S. Pat. No. 6,435,994 to Friedmann et al.,. U.S. Pat. No. 6,461,268 to Milner, U.S. Pat. No. 6,461,271 to Nakano et al., U.S. Pat. No. 6,561,941 to Nakano et al., U.S. Pat. No. 6,569,051 to Hirano et al., U.S. Pat. No. 6,599,213 to Fleytman et al., U.S. Pat. No. 6,626,780 to Fragnito, U.S. Pat. No. 6,626,781 to Van Der Kamp et al., U.S. Pat. No. 6,648,781 to Fischer et al., U.S. Pat. No. 6,652,399 to Van Spijk et al., U.S. Pat. No. 6,656,070 to Tay, U.S. Pat. No. 6,659,906 to Oshidari, U.S. Pat. No. 6,659,907 to Hirano et al., U.S. Pat. No. 6,679,805 to Rienks et al., U.S. Pat. No. 6,682,451 to Luh et al., U.S. Pat. No. 6,695,742 to Hagiwara, U.S. Pat. No. 6,709,355 to O'Hora, and U.S. Pat. No. 6,712,724 to Katou, all of which are incorporated by reference as if fully set forth herein. Further examples of CVTs are illustrated in Great Britain Patent Nos. 2 339 863 to Milner and 2 342 130 to Milner, Great Britain Patent Application Nos. 0016261.0 to Milner, 0320462.5 to Milner, 0121330.5 to Milner, 0220741.3 to Milner, and 0326596.4 to Milner, and International Patent Application No. PCT/GB02/04065 to Milner, each of which is incorporated by reference as if fully set forth herein. Examples of IVTs are illustrated in U.S. Pat. No. 6,616,564 to Shibukawa, which is also incorporated by reference as if fully set forth herein. The CVTs included in the systems described herein may be configured as described in these patents.

Figure 12:
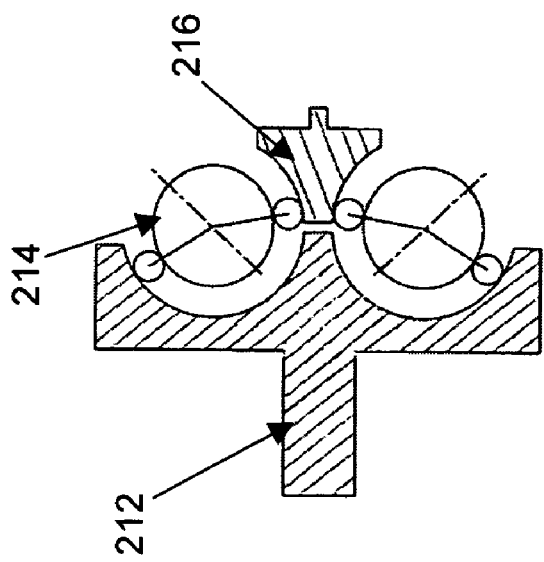
FIGS. 11 and 12 are schematic diagrams illustrating cross-sectional views of mechanical CVT systems with various input, output, and control devices.
Figure 13:
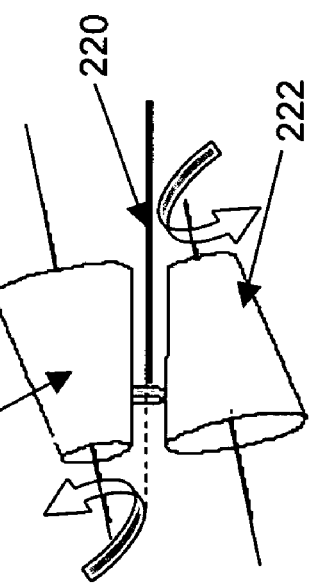
FIG. 13 is a schematic diagram illustrating a perspective view of a mechanical CVT system with different input, output, and control devices.
Figure 11:
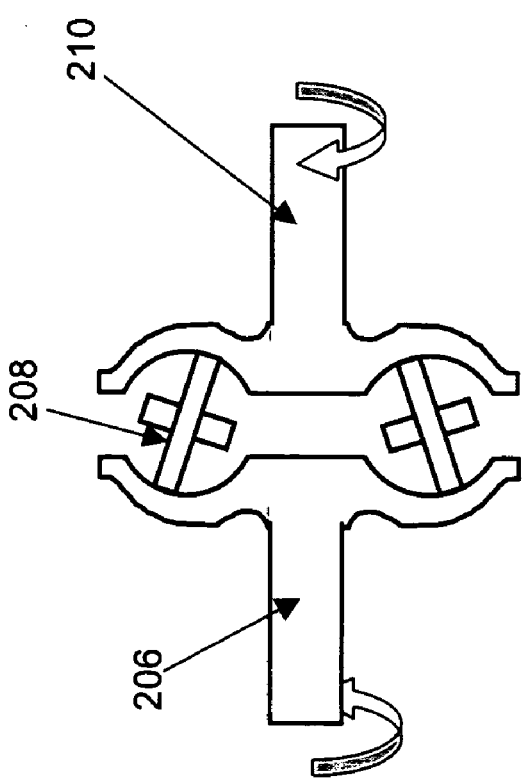

In one of the many varieties of CVTs, rollers meet the input shaft at an angle. Traction occurs at the contact between the roller and the shaft. When the rollers are tilted more toward the input shaft, the speed decreases; when they are tilted away from the input shaft, the speed increases. In other CVT designs, the traction occurs between a cone and a ring, between a ball and a disk, or between a toroidal element and a roller. FIGS. 11-13 illustrate several variations of CVTs as examples.

As shown in FIG. 11, this example of a CVT includes toroidal input shaft 206. Toroidal input shaft 206 is coupled to disk control mechanism 208. Disk control mechanism 208 is also coupled to toroidal output shaft 210. Relative rotation of the disk elements of disk control mechanism 208 controls one or more system components. In particular, relative rotation of the disk elements of disk control mechanism 208 controls the relative rotation of toroidal input shaft 206 and toroidal output shaft 210, which in turn controls the one or more system components coupled to output shaft 210 of the CVT.

In contrast, as shown in FIG. 12, another example of a CVT includes toroidal input shaft 212, which is coupled to spherical control mechanism 214. Spherical control mechanism 214 is also coupled to toroidal output shaft 216. Relative rotation of the spherical elements of spherical control mechanism 214 controls one or more system components. In the example shown in FIG. 13, the CVT includes conical input shaft 218 coupled to disk control mechanism 220. Disk control mechanism 220 is also coupled to conical output shaft 222. Relative rotation of the conical elements of the CVT (e.g., the conical input shaft and output shaft) controls one or more system components.

Particularly attractive CVT devices are described by Milner in the patents and patent applications to Milner incorporated by reference above. For example, as described in U.S. Pat. No. 6,461,268 to Milner, Milner provides a CVT device of the type having planetary members in rolling contact with radially inner and outer races each comprising two axially spaced parts, with control means for selectively varying the axial separation of the two parts of one race and thus the radial position of the planetary members in rolling contact therewith, in which there are provided means sensitive to the torque applied to a drive-transmitting member of the transmission operable both to determine the compensating variation in the separation of the two parts of the other race and thus the transmission ratio of the device and to vary the forces exchanged between the planets and the races normal to the interface between them.

In a preferred embodiment, the planet members are substantially spherical bodies. They may be right circular, oblate or prolate spheroids. Alternatively, the planet members may have respective first and second surface portions comprising surfaces of revolution about the same axis (for each member), the surface portions being inclined with respect to one another in opposite directions about the axes of revolution. The planet members may have a convex or concave surface of revolution defined by a curved generatrix which may be a regular or irregular curve or a part-circular curve. In the case of a part-circular generatrix this may be a semi-circle, in which case the surface of revolution of the planet member is spherical.

In such a structure, the inner and outer races preferably comprise two parts, one in contact with each of the first and second portions respectively, and each having a respective surface constituted by a surface of revolution about a common axis and inclined in opposite directions with respect to the axis. The two parts of one of the inner or outer races may be supported in such a way as to be relatively displaceable towards or away from one another whereby to vary the radius of the point or line of contact between the one race and the planet members.

Embodiments may be provided with torque-sensitive mechanical coupling means interposed between an input drive member and one of the races whereby to balance the torque transmission and the contact pressures between the two parts of that race and the planet members.

In practice, it is preferred that the planet members are substantially spherical and captive between the radially inner races and the radially outer races, there being roller follower members circumferentially intercalated between adjacent pairs of planet members for transmitting drive to or from the planet members. In such an arrangement, it is particularly convenient if the roller follower members are carried on a planet carrier member to which drive to or from the planet members is transmitted in operation of the device.

In general terms, Milner provides a drive transmission device as defined above, in which the axes of rotation of the planet members about their own axis are substantially parallel to the axis of rotation of the planets about the radially inner race. In such a drive transmission device, it is a particular feature that the axis of rotation of the radially inner race is substantially parallel to the axis of the means defining the radially outer race defining the planetary path of the planet members.

Figure 14A:
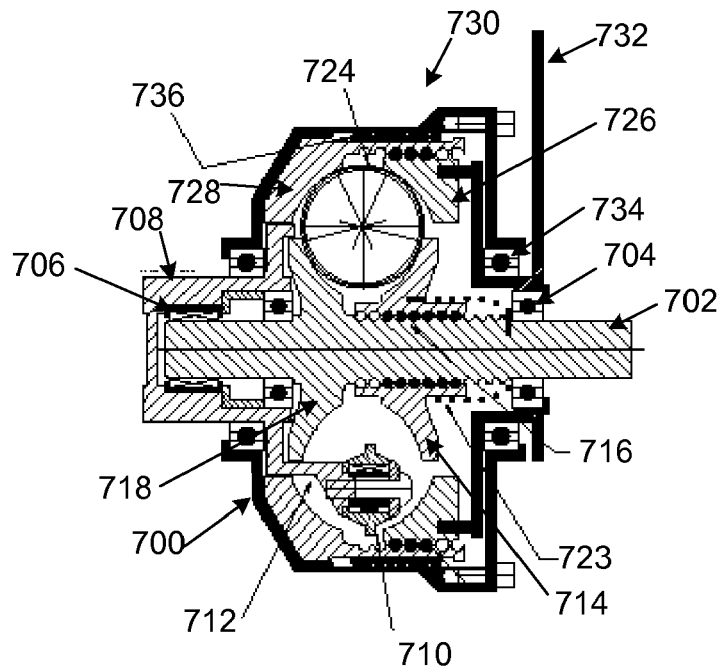
FIGS. 14a and 14b are schematic diagrams illustrating cross-sectional side views of a CVT that includes planetary members.
Figure 14B:
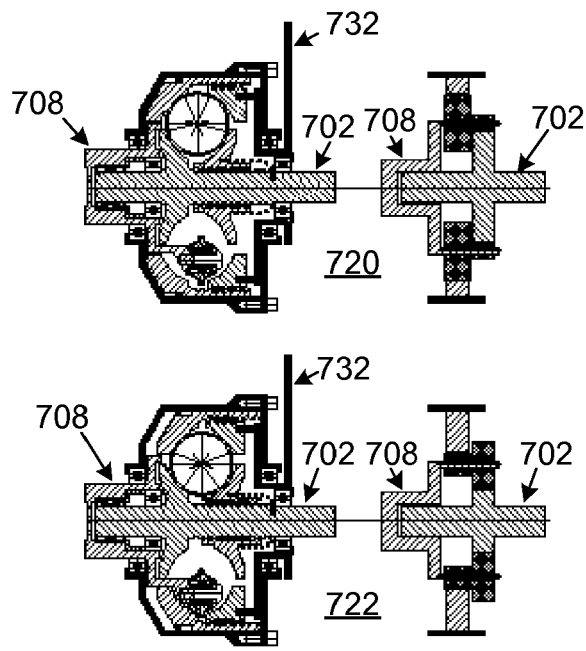

FIGS. 14a and 14b illustrate one embodiment of a CVT that includes planetary members. This CVT may be included in any of the systems described herein. Referring to FIGS. 14a and 14b, this CVT mechanism is formed as a variable radius epicyclic mechanism having rolling traction torque transfer with the advantage that the shaft bearings and housing are not subject to large forces and the moving parts can be based on traditional roller and ball bearing technology. It also has the advantages that it includes a purely mechanical preload and torque sensing system and that it can be splash or grease lubricated by a known traction fluid lubricant without requiring special lubricating techniques. As will be appreciated from the description which follows, the control of the transmission ratio can be effected by a simple mechanical device.

The variable radius epicyclical transmission device shown in FIGS. 14a and 14b sometimes referred to as a variator, includes housing 700 within which is mounted input shaft 702 bearing rolling element bearings 704, 706 within planet cage 708 carrying three planet follower members 710. Planet follower members 710 are rotatably borne on planet cage 708 by planet follower shafts 712. In this example, planet cage 708 constitutes the output shaft of the transmission mechanism.

On input shaft 702 is carried radially inner race 714 which is engaged to shaft 702 by means of a coupling that includes a helical interengagement in the form of screw threaded engagement 716. Radially inner race 714 and screw threaded engagement 716 are configured such that a relative rotation of input shaft 702 and inner race parts 714, 718 in a one directional sense will cause the two parts to be displaced towards one another whereas axial separation of two race parts 714, 718 of the inner raceway occurs where there is relative rotation between them and input shaft 702 in the opposite directional sense. Such displacement of the inner race parts is further illustrated in FIG. 14b in high ratio displacement 720 and low ratio displacement 722. Axial displacement of the inner race parts 714, 718 is limited by priming spring 723, which urges the two inner race parts apart.

Three spherical planetary members 724 are engaged between inner raceway parts 714, 718 and the outer raceway also comprising two axially separated annular raceway members 726, 728. Rolling tracks of raceway members 714, 718, and 726, 728, each comprise in cross-section, a part-circular arcuate surface the radius of which is slightly greater than the radius of spherical planetary members 724.

Outer raceway members 726, 728 are engaged by an axial adjustment mechanism generally indicated 730 and schematically shown in FIG. 14a as lever 732 pivotally mounted on reaction member 736 such that turning the lever in one direction or the other about pivot 734 by which it is connected to reaction member 736 causes raceway parts 726, 728 to be urged axially towards one another or allowed to separate axially from one another by means of outer race ball screw 729. The outer raceway is provided with means for preventing its rotation about the common axis of rotation of input shaft 702, inner and outer raceways, output shaft 708 and spherical planetary members 724.

In operation of the transmission, rotation of shaft 702 is transmitted to the inner raceway rotation of which causes rotation of balls 724 by rolling contact therewith, balls 724 rolling over stationary raceway members 726, 728. Rotation of balls 724 is transmitted via roller followers 710 to roller cage 708 and thus to the output shaft. By displacing lever 732 in one direction or the other, parts 726, 728 of the outer raceway can be urged towards one another or allowed to move axially away from one another. Axial approach of two outer raceway members 728, 728 applies pressure to planetary balls 724 causing them to move radially inwardly of the transmission device urging two inner raceway parts 714, 718 apart. The helical interengagement between radially inner raceway parts 714, 718 and input shaft 702 acts in effect as a torque-sensitive mechanism in that the helical interengagement is such that rotation of shaft 702 in the intended direction of drive causes raceway parts 714, 718 to approach one another axially when resisted by drag so that any play in the rolling contact between the raceways and planetary balls 724 is taken up and compensated by the tendency of raceway parts 714, 718 to approach one another until the forces exerted on the helical interengagement between raceway parts 714, 718 and drive shaft 702 matches the reaction forces between raceway parts 714, 718 and planetary balls 724, at which point no further relative axial displacement of raceway parts 714, 718 takes place and drive transmission takes place at a transmission ratio determined by the radial position of balls 724 when this occurs.

In the configuration illustrated in FIG. 14b it will be seen that the radius of rolling contact between balls 724 and the inner raceway is relatively large and the radius of contact between balls 724 and the outer raceway is relatively small. In this configuration the transmission ratio between input shaft 702 and output shaft 708 is at its lowest. By allowing lever 732 to move in the opposite direction, however, the outer raceway parts are allowed to move apart so that balls 724 can move radially outwardly compensated by axial approach of the inner raceway parts.

The difference between the curvature of the curved surfaces of the inner and outer raceways and the spherical planet members will determine the precise shape of the contact path which in practice exits between the members in rolling contact. Although in an idealized situation the contact would be a point contact, in practice, because the interior of such a variable transmission would contain a lubricant in the form of a special traction fluid which both lubricates the moving parts and enhances the rolling traction between them, the points of contact will constitute contact patches which are larger the closer the radii of the contacting surfaces are to one another. It is, of course, undesirable that these patches should be too large in order to avoid the so-called spin loss resulting from forces developing in the hydrodynamic fluid between the two elements in rolling contact.

The continuously variable transmission mechanism described above is extremely compact and highly efficient, and has no need for a pressurized hydraulic circuit for either lubrication or control purposes in order to achieve the required function. It can be in modular form and is scalable readily to accommodate both large and small size applications.

It is appreciated that, of course, if input shaft 702 were considered as a unitary member there would be no way in which two parts 714, 718 of the inner race could be fitted over the unthreaded ends of shaft 702. This, however, could be achieved by forming input shaft 702 as a composite member with the unthreaded parts assembled to the threaded parts after sun members 714, 718 have been fitted thereto. Alternatively, however, shaft 702 may simply be of smaller diameter, at the end portions which are not threaded, to match the radially innermost dimension of the thread flights allowing sun parts 714, 718 to be slid along them upon assembly.

Although as illustrated in FIG. 14a, the separation of two race parts 726, 728 is controlled by simple lever 732 with suitable counteracting member 736 applying symmetrical forces to two race parts 726, 728 to cause them to move together or apart as determined by the movement of lever 732, it will be appreciated that in a practical embodiment it is necessary to apply the axial forces to the raceway parts over the entirety of the circumference or at least at several symmetrically located positions.

Figure 14C:
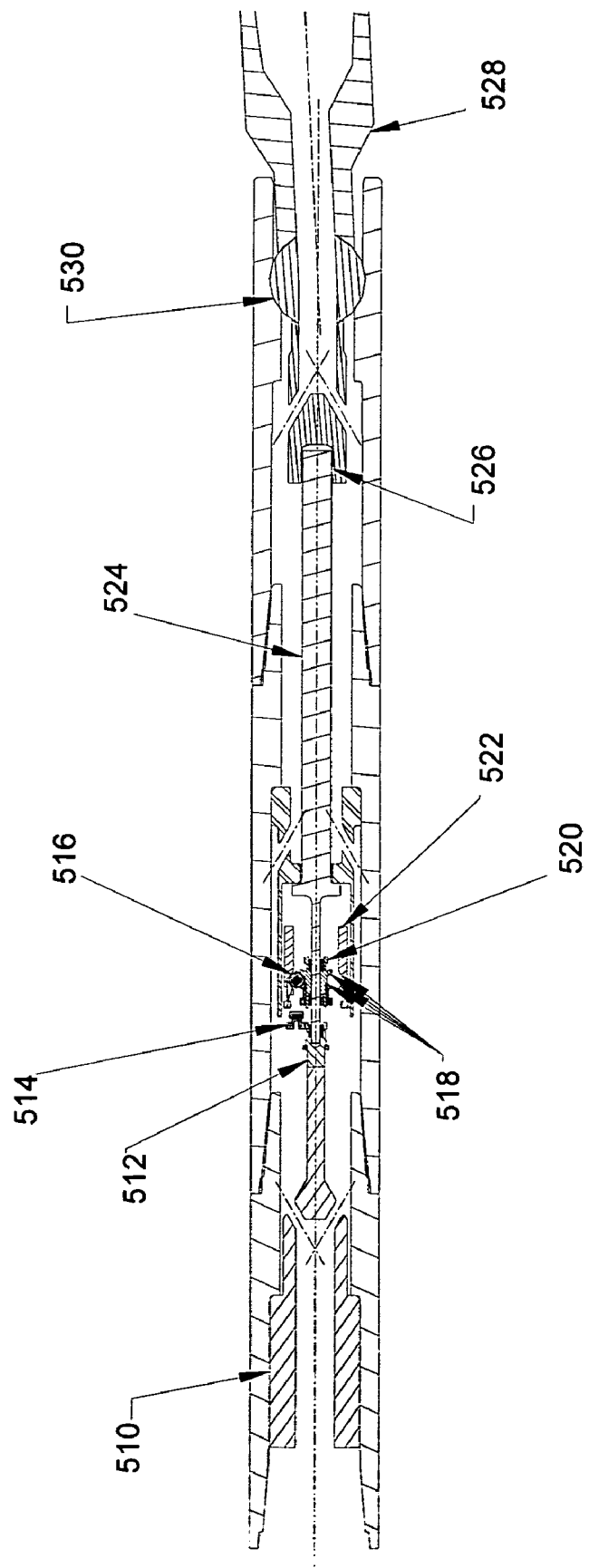

FIGS. 14c-14f illustrate various ways in which a CVT similar to those described by Milner and shown in FIGS. 14a and 14b may be incorporated in a system configured to drill a borehole or any of the other systems described herein (e.g., a system configured to complete a well, etc.). The CVTs included in these systems may be configured as IVTs. As shown in FIG. 14c, this embodiment of the system is designed as having an internal mandrel type architecture. The system includes power supply unit 510 coupled to input shaft 512 of the CVT. The power supply unit may include any of the power supplies described herein. The CVT includes CVT roller ball 516 and CVT toroids 518. The CVT may be further configured as described above in FIGS. 14a and 14b in the patents and patent applications of Milner that are incorporated by reference above.

As shown in FIG. 14c, the CVT is coupled to input planetary gears 514 and output planetary gears 520. Input planetary gears 514 and output planetary gears 520 may function as fixed gear ratio devices as described further herein. In addition, the input and output planetary gears may be configured such that the CVT functions as an IVT. The input and output planetary gears may be further configured as described by Milner.

The system may also include CVT control arm 522, which may be configured as described herein. Output shaft 524 of the CVT is coupled to adjustment device 526. The adjustment device may include any suitable adjustment device known in the art. The adjustment device is coupled to bit shaft 528. Bit shaft 528 may include any suitable bit shaft known in the art. Pivot knuckle 530 may also be coupled to bit shaft 528. The system shown in FIG. 14c may be further configured as described herein.

As shown in FIG. 14d, this embodiment of the system is designed as having an annular type architecture. In other words, this system includes central cylinder 532 through which drilling fluid can flow. This system also includes power supply unit 534 coupled to input shaft 536 of CVT 538. Power supply unit 534 may include any of the power supplies described herein or known in the art. CVT 538 may be further configured as described by Milner in any of the patents or patent applications incorporated herein by reference.

CVT 538 is coupled to input planetary gears 540 and output planetary gears 542. Input planetary gears 540 and output planetary gears 542 may function as fixed gear ratio devices as described further herein. In addition, the input and output planetary gears may be configured such that the CVT functions as an IVT. The input and output planetary gears may be further configured as described by Milner.

The system also includes control arm 544 coupled to the CVT, which may be configured as described herein. Electronics 546 may also be coupled to the CVT. The control arm and the electronics may be further configured as described herein and may form at least a portion of a control subsystem. Output shaft 548 of the CVT may be coupled to bit shaft 550 by pivot knuckle 552. The system shown in FIG. 14*d* may be further configured as described herein.

Figure 14F:
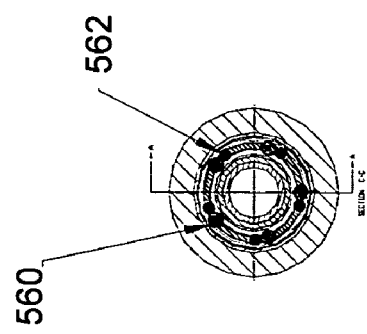
FIG. 14f is a schematic diagram illustrating a cross-sectional view of the system of FIG. 14e when viewed along plane C.
Figure 14E:
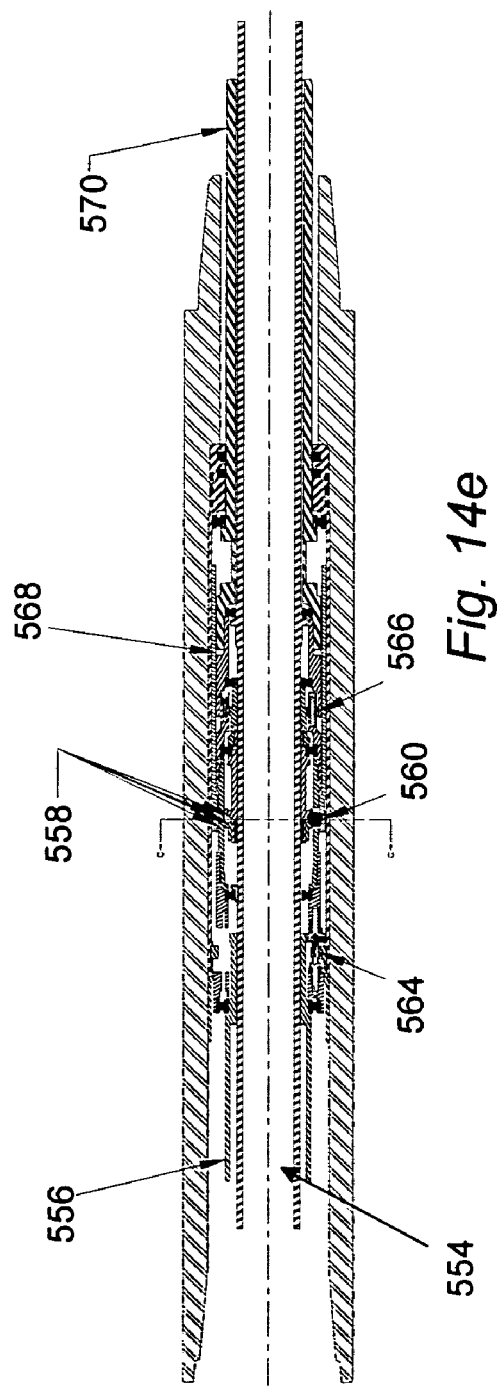

The system shown in FIGS. 14*e* and 14*f* is also designed as having an annular type architecture. For example, like the system shown in FIG. 14*d*, the system shown in FIGS. 14*e* and 14*f* includes central cylinder 554 through which drilling fluid can flow. The system shown in FIGS. 14*e* and 14*f* includes a power supply unit (not shown) coupled to input shaft 556 of the CVT. The power supply unit may include any power supply described herein or known in the art. The CVT includes CVT toroids 558, CVT roller ball 560, and CVT follower assembly 562. The CVT may be further configured as described by Milner in any of the patents or patent applications incorporated herein by reference.

Input planetary gears 564 and output planetary gears 566 are coupled to the CVT. Input planetary gears 564 and output planetary gears 566 may function as fixed gear ratio devices as described further herein. In addition, the input and output planetary gears may be configured such that the CVT functions as an IVT. The input and output planetary gears may be further configured as described by Milner. CVT control arm 568 may be coupled to the CVT. The CVT control arm may be configured as described herein. Output shaft 570 of the CVT may be coupled to a bit shaft or other system elements (not shown) as described herein. The system shown in FIGS. 14*e* and 14*f* may be further configured as described herein.

Nearly all CVTs are also classified as traction drives because they transfer power by smooth-surface contact rather than by gears, chains, belts, or pulleys. New advancements in some forms of mechanical CVTs have allowed for flexible meshing of geared components, while still allowing for translation of relative rotation. These types of modifications are being developed to prevent slipping and backlash issues present in some form of tractions drives. In general, mechanical CVTs can be defined as CVTs that have mechanical elements for controlling the rotation of one or more components coupled to an output shaft of the CVT. For example, as will be described further herein, an output shaft of a mechanical CVT may be coupled to one or more system components, and mechanical elements of the CVT may control (e.g., the rotation or position) of the one or more system components.

A different class of CVTs is electrical continuous velocity transmissions (ECVTs). This form of CVT utilizes an electrical motor in place of mechanical means for controlling rotational velocity. In these designs, the input power is converted to electrical power, and the motor is controlled through complex electronics to allow for control of the velocity and torque on the output shaft. ECVTs have been developed in the automotive industry to address the development of hybrid and battery powered vehicles. In a hybrid vehicle, the electric power can be pulled directly from the batteries, or it can be converted from the power generation plant through an alternator. These systems provide servo-systems for large scale applications.

Various forms of ECVTs have been utilized for downhole oilfield applications. These applications cover a wide variety of fields including mud-pulse telemetry, steerable control systems, and orientation mechanisms in applications such as coiled tubing or well completions. These systems are normally developed using complex electromagnetic servo-systems. Examples of various systems that utilize an ECVT include a measuring-while-drilling (MWD) system having motor speed detection during encoding illustrated in U.S. Pat. No. 4,103,281 to Strom et al., an actively controlled rotary steerable system illustrated in U.S. Pat. No. 6,092,610 to Kosmala et al., and an apparatus and method for orienting a downhole tool illustrated in U.S. Pat. No. 6,419,014 to Meek et al., all of which are incorporated by reference as if fully set forth herein. New classes of CVT drives provide a simple mechanical system with a simple drive to replace complicated electromagnetic servo-systems.

The orienter described by Meek et al. is particularly suitable for use on coiled tubing or small diameter drill pipe. The orienter generally includes a motor, turbine, or other device for selectively converting the rotational kinetic energy produced from fluid flow through the device to mechanical power, and applying the mechanical power to a downhole tool through a gear train for orienting the downhole tool. The orienter is utilized during directional drilling and other operations such as well intervention, fishing, and multilateral re-entry operations. The downhole tool preferably includes a steerable mud motor. In one embodiment, the direction of the borehole is controlled by azimuthal rotation of the orienter in response to downlink commands from the surface by changing fluid flow rate through the orienter in a predefined series of steps. An orienter as described herein may be further configured as described by Meek et al.

Figure 26:
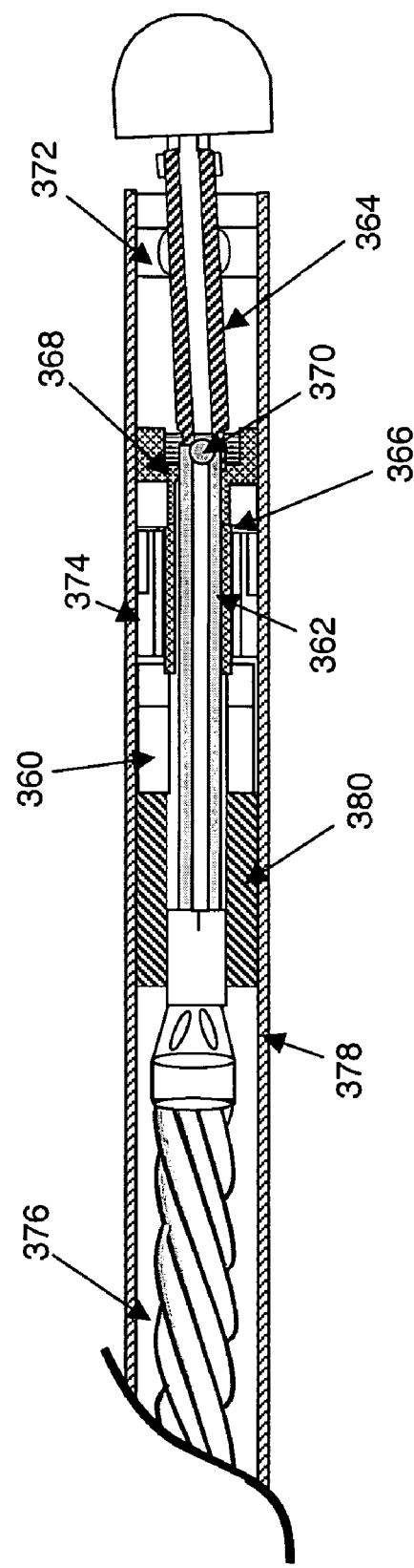
FIG. 26 is a schematic diagram illustrating a cross-sectional view of a CVT rotary steerable system design utilizing a Moyno (PDM) motor as a rotational input and an additional drive mechanism for the bit shaft.

An orienter as described and illustrated in U.S. Pat. No. 6,419,014 to Meek et al. or any other orienter known in the art may be incorporated in one of the systems described herein. An alternative to the orienter described by Meek et al. may be incorporated in the system as shown in FIG. 26 (which is described in more detail below). In particular, an orienter may be coupled to the motor of the system shown in FIG. 26. Such a system may have the same downhole configuration as shown in FIG. 26 with the motor disposed above or below the orienter.

Still further applications for CVTs exist for other downhole oilfield applications. Any application that requires a controlled rotary output can be considered a candidate for using a mechanical CVT. The use of a CVT in downhole operations for a drilling system allows for a highly reliable system with simple control. In addition, a system into which a CVT is incorporated may have a variety of configurations. For example, the system may be configured as a measuring-while-drilling (MWD) system in one embodiment. Examples of MWD or "logging-while-drilling" systems into which a mechanical CVT may be incorporated are illustrated in U.S. Pat. No. 4,103,281 to Strom et al., U.S. Pat. No. 4,167,000 to Bernard et al., U.S. Pat. No. 4,216,536 to More, U.S. Pat. No. 4,303,994 to Tanguy, U.S. Pat. No. 4,314,365 to Petersen et U.S. Pat. No. al., U.S. Pat. No. 4,479,564 to Tanguy, U.S. Pat. No. 4,698,794 to Kruger et al.,. U.S. Pat. No. 4,805,449 to Das, U.S. Pat. No. 5,149,984 to Schultz et al., U.S. Pat. No. 5,237,540 to Malone, U.S. Pat. No. 5,249,161 to Jones et al., U.S. Pat. No. 5,293,937 to Schultz et al., U.S. Pat. No. 5,368,108 to Aldred et al., U.S. Pat. No. 5,371,448 to Gleim, U.S. Pat. No. 5,373,481 to Orban et al., U.S. Pat. No. 5,375,098 to Malone et al.,. U.S. Pat. No. 5,387,767 to Aron et al., U.S. Pat. No. 5,448,227 to Orban et al., U.S. Pat. No. 5,631,563 to Moriarity, U.S. Pat. No. 5,753,812 to Aron et al., and U.S. Pat. No. 6,267,185 to Mougel et al., which are incorporated by reference as if fully set forth herein.

Furthermore, a system that includes a CVT as a control mechanism may be configured to drill a borehole and/or to complete a well. In either embodiment of such a system, an input shaft of the CVT is coupled to a power supply. In a drilling application, an output shaft of the CVT is coupled to one or more system components such that the CVT controls the one or more system components (e.g., controls the rotation or position of the system component(s)). The one or more system components may include, for example, a bit shaft, a biasing subsystem component, a measuring-while-drilling component, etc. In a well completion application, an output shaft of the CVT is coupled to one or more completion tool components such that the CVT controls the one or more completion tool components (e.g., controls the rotation or position of the completion tool components). The CVT and the systems may be further configured as described herein.

In a well completion application, the system may also be configured to orient downhole equipment within a borehole of the well to connect a latch for use in drilling of multi-lateral wells. In another embodiment, the system may be configured to orient downhole equipment in a borehole of the well to position sensors within the borehole or to open or close a control component (e.g., a valve) of the system. In an additional embodiment, the CVT may be configured to rotate components that open an expandable casing. In some embodiments, the CVT may be configured to control relative rotation of a downhole pump to operate the pump at maximum efficiency and optimal rotation rate for fluids being pumped. In an additional embodiment, the system may be configured to convert the rotation to axial movement along a length of a pipe using a ball screw. In one such embodiment, the axial movement may position the one or more completion tool components axially within a borehole of the well. The one or more completion tool components may include control elements, sensors, valves, or some combination thereof.

In another embodiment, the system may be configured as a steerable drilling system such as adjustable stabilizer, adjustable bend, coiled tubing motor orienter and rotary steerable system. Rotary steerable systems have become more common recently due to their potential for revolutionizing the way directional wells are drilled. These systems have the ability to drill faster, farther, and more accurately than conventional steerable systems. As these systems become accepted throughout the industry, expectations of their performance will increase. Reliability and steerability will become higher priorities.

Steerable systems can be categorized by their mode of operation. There are two steering concepts for these systems: point-the-bit and push-the-bit, some examples of which are provided above. Push-the-bit tools operate by applying a side force against the formation in the drilled borehole. In one embodiment, the system may include one or more adjustable stabilizers for applying a side force against the formation in the drilled borehole. Applying the side force against the formation can also be done with synchronous pads or by a constant offset force on a geostationary assembly. A force is applied to the formation in a direction opposite the desired well path deviation. A side cutting action occurs at the bit due to the opposing force causing the bit to preferentially remove cuttings thereby deviating the well trajectory.

Point-the-bit systems operate by placing a relative offset between the axis of the bottom hole assembly and the axis of the bit. This offset or bend in the system is much like the bend created from a bent housing in a standard motor assembly. In a rotary steerable system, this bend is held geostationary with respect to the formation during rotation.

To understand the point-the-bit principle, one can make comparisons to conventional drilling systems that use motors or turbines. A bent housing and stabilizer on the bearing section allow the motor to drill in either an oriented (sliding) or a rotary mode. In the rotary mode, both the bit and the drillstring rotate. The rotation of the drillstring negates the effect of the bent housing, and the bit drills an over-gauge straight path parallel to the axis of the drillstring above the bent housing. In the sliding mode, only the bit rotates. The motor changes the well course in the direction of the bent housing, and the drillstring slides down the hole behind the bit. In the point-the-bit system, the "bent housing" is contained within the collar of the tool. This "bent housing" is controlled by means of a biasing mechanism, which rotates counter to the direction, and at the same velocity as the drillstring. This control allows the "bent housing" to remain geo-stationary (non-rotating) with respect to an earth reference frame, while the collar is rotating.

A rotary steerable system may be generally characterized as a biasing system or a biasing subsystem of a drilling system. In general, a biasing subsystem is configured to control a tendency of a bottom hole assembly during drilling of a borehole. In this manner, a system that includes a biasing subsystem may be configured to directionally drill a borehole. Other types of biasing subsystems, however, may also be used to control a tendency of a bottom hole assembly during drilling of a borehole. For example, the biasing subsystem may include an adjustable stabilizer, as described further herein. In a different example, the biasing subsystem may be configured to drill at an angle to the borehole using a deflecting tool such as whipstock or any other deflecting tool that is known in the art. One example of a biasing subsystem that uses a whipstock and coiled tubing to directionally drill a well is illustrated in U.S. Pat. No. 5,488,989 to Leising et al., which is incorporated by reference as if fully set forth herein. The systems described in this patent may be modified to incorporate a CVT as described further herein. Additional examples of biasing subsystems to which a CVT may be coupled as described further herein are illustrated in U.S. Pat. No. 5,421,420 to Malone et al., U.S. Pat. No. 5,431,219 to Leising et al., U.S. Pat. No. 5,467,832 to Orban et al., U.S. Pat. No. 5,484,029 to Eddison, U.S. Pat. No. 5,520,256 to Eddison, U.S. Pat. No. 5,529,133 to Eddison, U.S. Pat. No. 5,542,482 to Eddison, U.S. Pat. No. 5,617,926 to Eddison et al., and U.S. Pat. No. 5,727,641 to Eddison, each of which is incorporated by reference as if fully set forth herein.

The biasing subsystem may be configured to control the tendency of a bottom hole assembly in two dimensions or three dimensions. In addition, the biasing subsystem may be configured to rotationally position the one or more system components. Alternatively, or additionally, the biasing subsystem may be configured to axially position the one or more system components. In such an embodiment, the one or more system components may be coupled to a ball screw. In this manner, an axial position of the one or more system components may suitably altered.

FIG. 15 illustrates a schematic diagram of an embodiment of a CVT controlled rotary steerable system. The system includes power supply 224. Any system that provides relative rotation between components can be utilized to supply input power to CVT 226. The power supply for rotational input to CVT 226 can be any of a number of common sources of downhole rotary power known in the art.

Some of these common power supplies include, but are not limited to, a turbine assembly, an electric motor, a positive displacement motor (PDM) also known as a Moyno motor, etc. In some embodiments, the power supply may include a combination of different power supplies. For example, the power supply may include a turbine assembly in combination with a PDM. Relative rotation can also be harnessed by other means including the relative rotation between the system parts or the system parts and the formation. In this manner, the power supply for a CVT may be generated by relative rotation between elements of the system or between one or more elements of the system and a formation in which the borehole is being drilled. Examples of relative rotation include rotation between the system housing and a non-rotating housing in contact with the formation. A second example is the relative rotation through an eccentric mass within the system and another member of the system, where the eccentric mass is held geo-stationary due to its weight and the influence of gravity. In a further example, the power supply may be generated by relative rotation between a non-rotating sleeve and a drive shaft.

Input coupling 228 of the system between the power source and an input shaft of the CVT can be implemented in various ways. The selected coupling is highly dependent upon the power source. Examples of suitable couplings include direct coupling, direct coupling through a sealing means, and indirect coupling through magnetic or electromagnetic means. CVT 226 is coupled to directional biasing assembly 230 by output bias coupling 232. Output bias coupling 232 may be selected from the couplings described above or may be further configured as described herein.

Various CVT designs can be employed in the system described above. Depictions of several variations of mechanical CVTs are described above. The following description reviews several additional examples of the CVT design and control subsystem that can enhance system performance.

In one embodiment, a CVT can be designed to allow a central cylinder to traverse its longitudinal axis. The central cylinder can be utilized for fluid flow or a secondary shaft for the transmission of rotational energy (e.g., a drive shaft of a PDM motor). Examples of CVTs that include central shafts are shown in FIGS. 16 and 17. FIG. 16 illustrates a hollow disk toroidal CVT similar to that shown in FIG. 11. Elements of FIGS. 11 and 16 that may be similarly configured have been indicated with similar reference numerals. The CVT of FIG. 16 is different from that of FIG. 11 in that the CVT shown in FIG. 16 includes central cylinder 232 traversing longitudinal axis 234, which extends through toroidal input shaft 206, disk control mechanism 208, and toroidal output shaft 210. In this manner, central cylinder 232 is configured such that drilling fluid (e.g., "mud") can flow through the central cylinder. Alternatively, the central cylinder may be used to accommodate a secondary shaft for the CVT.

FIG. 17 illustrates a ball toroidal CVT similar to that shown in FIG. 12. Elements of FIGS. 12 and 17 that may be similarly configured have been indicated with similar reference numerals. The CVT of FIG. 17 is different from that of FIG. 12 in that the CVT shown in FIG. 17 includes central cylinder 236 traversing longitudinal axis 238, which extends through toroidal input shaft 212, spherical control mechanism 214, and toroidal output shaft 216. In this manner, central cylinder 236 is configured such that drilling fluid (e.g., "mud") can flow through the central cylinder. Alternatively, the central cylinder may be used to accommodate a secondary shaft for the CVT.

Figure 18:
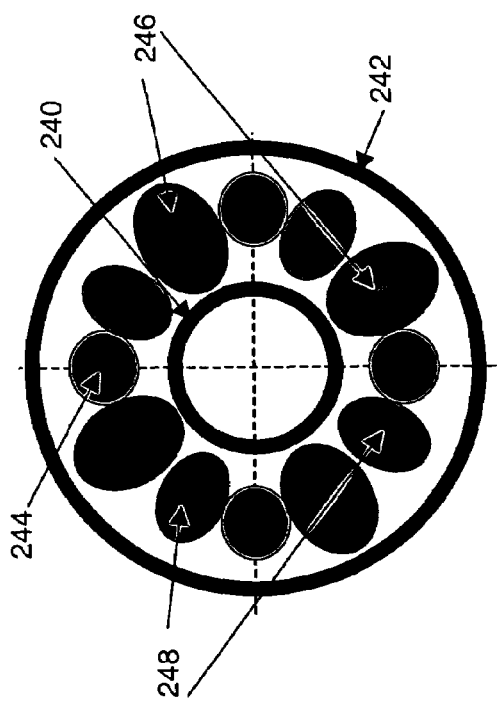
FIG. 18 is a schematic diagram illustrating a cross-sectional view of a conical CVT mechanism.

FIG. 18 provides a radial cross-sectional view of a hollow CVT mechanism using cones and disks. As shown in FIG. 18, the CVT mechanism includes inner housing 240 and outer housing 242. Inner housing 240 and outer housing 242 may be formed of any suitable material and may have any suitable dimensions. Control disks 244 are disposed between the inner housing and the outer housing. Input cones 246 and output cones 248 are also disposed between the inner housing and the outer housing. Each of the control disks is disposed between one input cone and one output cone. Although the CVT mechanism of FIG. 18 is shown to include four control disks, each of which is coupled to one of four input cones and one of four output cones, it is to be understood that the CVT mechanism may have any number of control disks, input cones, and output cones.

Figure 19:
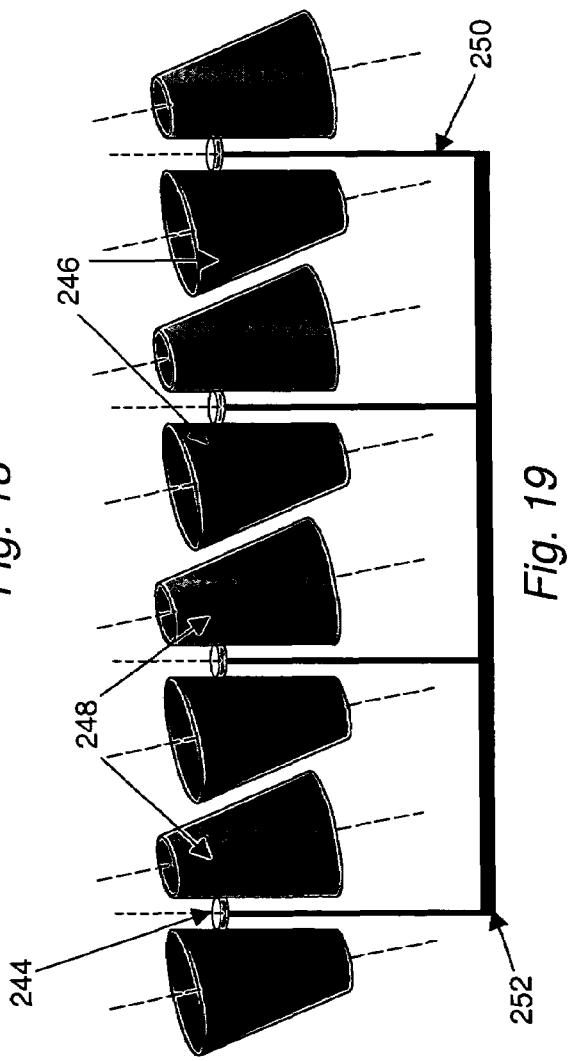
FIG. 19 is a schematic diagram illustrating an unwrapped view of a conical CVT mechanism.

FIG. 19 provides an unwrapped view of the hollow CVT mechanism using cones and disks 244. The axes of input cones 246 and output cones 248 are offset to allow control arms 250 to be parallel with the longitudinal axis of the CVT mechanism. Translation of the control arms is converted to rotation of the mechanical elements of the CVT, and as described above, relative rotation of the mechanical elements controls the rotation of the one or more system components. This design provides for simple control of control disks 244 using a worm gear and stepper motor, which can be coupled to control arms 250 by interface 252 to worm gear or motor. In one embodiment, interface 252 may include a gear and tooth assembly that couples control arms to mechanical elements of the CVT. The gear ratio is continuous between, but is limited by, the diameter of the cones that can fit within the internal and external housings.

Control mechanisms for a CVT are known in the art. Each of the systems described herein may or may not include a control subsystem coupled to a CVT. The control subsystem may be configured to alter one or more parameters of the CVT. For example, the control subsystem may be configured to alter a transmission ratio of the CVT. A transmission ratio of the CVT may be varied depending on one or more characteristics selected for the borehole, which will be drilled by the system. For example, the transmission ratio of the CVT may vary depending on the angle at which the borehole is being drilled. Alternatively, a transmission ratio of the CVT may vary depending on one or more characteristics of a formation in which the borehole will be or is being drilled. For example, the transmission ratio of the CVT may be varied depending on the composition of the portion of the formation being drilled.

The control subsystem may include an electrical subsystem, an electro-magnetic subsystem, a mechanical subsystem, a hydraulic subsystem, or some combination thereof.

In particular, a CVT control subsystem can range from a simple mechanical feedback system to complex control systems using hydraulics, electrical motors, electromechanical servo-systems, and combinations thereof. Examples of control subsystems that may be used with a CVT in the systems described herein are illustrated in U.S. Pat. No. 6,679,805 to Rienks et al. and U.S. Pat. No. 6,695,742 to Hagiwara, which are incorporated by reference as if fully set forth herein. The control subsystems shown and described herein may be further configured as described in these patents. In addition, a control subsystem coupled to the CVT may be configured to passively alter one or more parameters of the CVT. One example of such a control subsystem includes an eccentric mass that may be configured as described herein. Alternatively, a control subsystem coupled to the CVT may be configured to actively alter one or more parameters of the CVT. One example of such a control subsystem includes a sensor coupled to electronics that interface with the sensor and the CVT. The electronics may be configured to alter one or more parameters of the CVT depending on output signals generated by the sensor.

In one embodiment, the sensor feedback and control for the system can be mounted to the CVT output shaft thereby rotating with the output shaft. Alternatively, the sensor feedback and control can be mounted rotationally independent of the CVT input and output shaft. The mounting mechanism may vary depending on, for example, the overall system design.

The output shaft of the CVT in a steerable drilling system is rotationally controlled with reference to an earth's reference system (magnetic or gravitational). The output shaft can be held stationary with respect to any earth reference frame including the gravitational or magnetic fields. This ability allows the system to create directional control during a borehole or wellbore drilling process.

The output bias coupling between the CVT and the directional biasing subsystem is highly dependent upon the biasing subsystem itself. Various biasing subsystems have been developed and are usually characterized within the oilfield industry as push-the-bit or point-the-bit.

The following description reviews the ability of the downhole CVT control system to be utilized with various rotary steerable bias mechanisms to improve the overall design, cost, performance and reliability.

In one embodiment, the CVT control for point-the-bit rotary steerable systems may utilize a universal joint design. The system has considerable cost, complexity and thus reliability constraints due to the requirements to transform the rotational energy to electrical energy and back to a controlled rotation. The implementation can be significantly improved with the understanding that the system includes a form of transmission known as an electrical continuous velocity transmission (ECVT). This type of transmission is known in the automotive industry. Examples of various forms of ECVTs are illustrated, for example, in U.S. Pat. No. 5,345,154 to King, U.S. Pat. No. 6,054,844 to Frank, U.S. Pat. No. 6,371,878 to Bowen, and U.S. Pat. No. 6,447,422 to Haka, which are incorporated by reference as if fully set forth herein.

The system described by King provides an early example of ECVT development and includes a servo-controlled motor utilizing a breaking mechanism to control output shaft rotation for use in the automotive industry. There are similarities between the automotive transmission described by King and the system described by Kosmala et al. for the ECVT's downhole counterpart. The schematics for the control systems described by King and Kosmala et al. differ only in the power generation mechanism.

The power plant described by King includes any variation of common automotive engine. The engine is operated in its optimal power output range to power an electricity producing alternator. The power generation mechanism described by Kosmala et al. is a common fluidic turbine. The turbine transforms drilling fluid flow into rotational power utilized to spin an electricity producing alternator. A noted problem for control of the oilfield turbine is that the drilling fluid flow rate is optimized for drilling parameters independent of the power requirements for the rotary steerable system.

A novel solution can be implemented with the understanding that the rotary steerable systems complex servo-control system represents an ECVT and can be replaced by a mechanical CVT. To date, over 1000 patents on various mechanical CVT designs and improvements have been issued, some of which have been incorporated above by reference as if fully set forth herein. The recent development and advancements in CVTs in the automotive industry can be exploited to dramatically reduce the complexity of the actively controlled rotary steerable system. This novel system utilizes a mechanical CVT to provide a much simpler solution for transforming the uncontrolled rotary input of the turbine to a controlled rotary output. A conceptual design of an actively controlled rotary steerable system utilizing a CVT is shown in FIG. 20.

Figure 20:
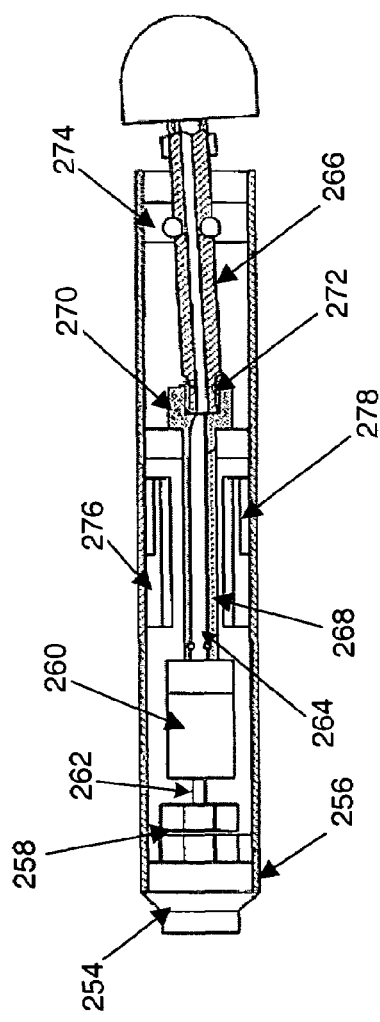
FIG. 20 is a schematic diagram illustrating a cross-sectional view of an actively controlled rotary steerable system utilizing a continuous velocity transmission control.

As shown in FIG. 20, the system includes threaded section 254 coupled to tubular collar 256. Fluid energized turbine 258 is disposed within tubular collar 256. Fluid energized turbine 258 serves as a power supply for CVT 260. In particular, fluid energized turbine 258 is coupled to input shaft 262 of CVT 260. Fluid energized turbine 258 may be coupled to the input shaft of the CVT using any suitable coupling known in the art. Output shaft 264 of CVT 260 is coupled to bit shaft 266 by offsetting mandrel 268, rotary drive head 270, and eccentric receptacle 272 as shown in FIG. 20. In a similar manner, the output shaft of the CVT may be coupled to other components of the system by such a mandrel. The system also includes universal joint 274 coupled to bit shaft 266. In this manner, the system may be configured as a point-the-bit system. The system may also include control subsystem 276, which is coupled to CVT 260. In some embodiments, the system may also include electronics 278. Electronics 278 may include any suitable electronic component(s) known in the art.

The system is simplified by removal of the alternator, motor, and complex servo-control system for controlling the motor that are required in similar rotary steerable systems. These components are replaced by a mechanical CVT with its simpler servo-control mechanism. The new system provides the ability to remove major components within the existing system to simplify the design, reduce cost, and improve reliability. The overall length of the system is reduced, which has additional benefits when drilling. The mechanical CVT has other inherent benefits including operation at the maximum torque output available in the system.

Figure 21:
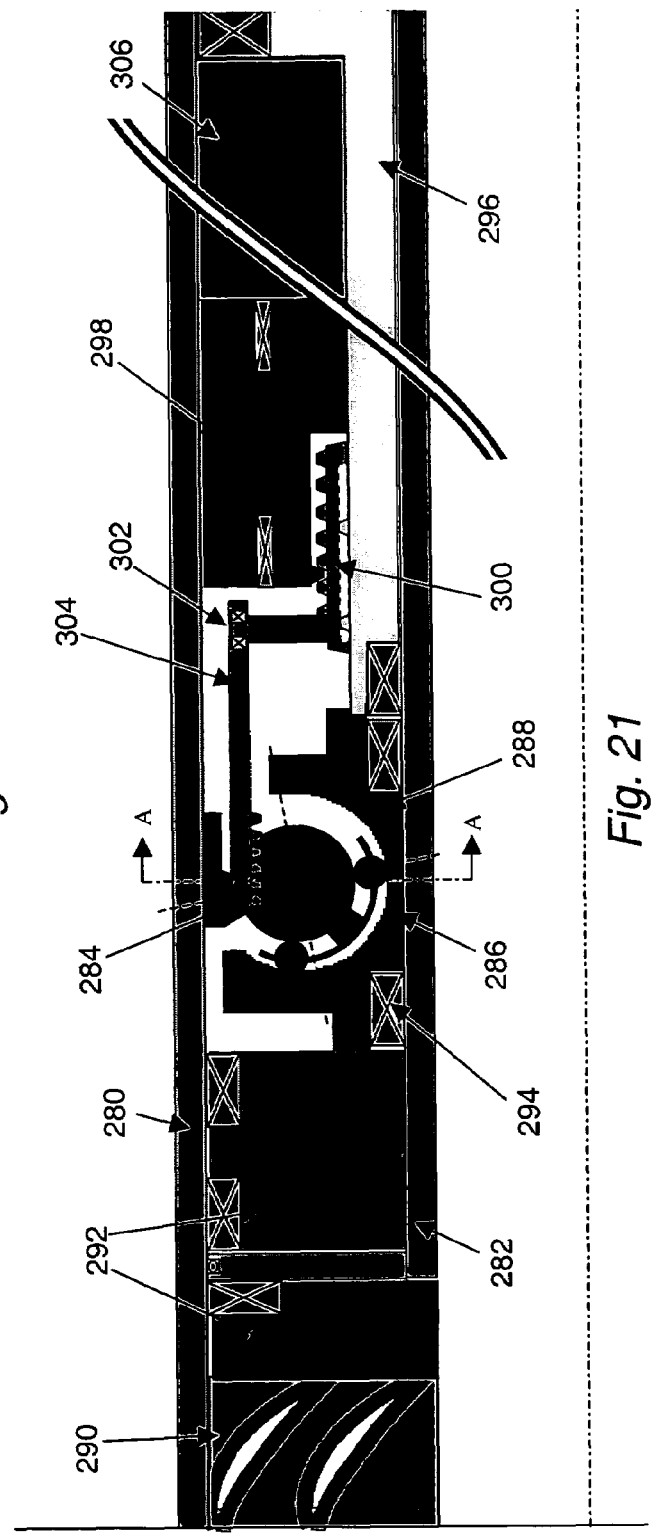
FIG. 21 is a schematic diagram illustrating a cross-sectional view of a ball toroidal CVT control assembly for a point-the-bit rotary steerable system using a magnetic coupled turbine for power generation.
Figure 22:
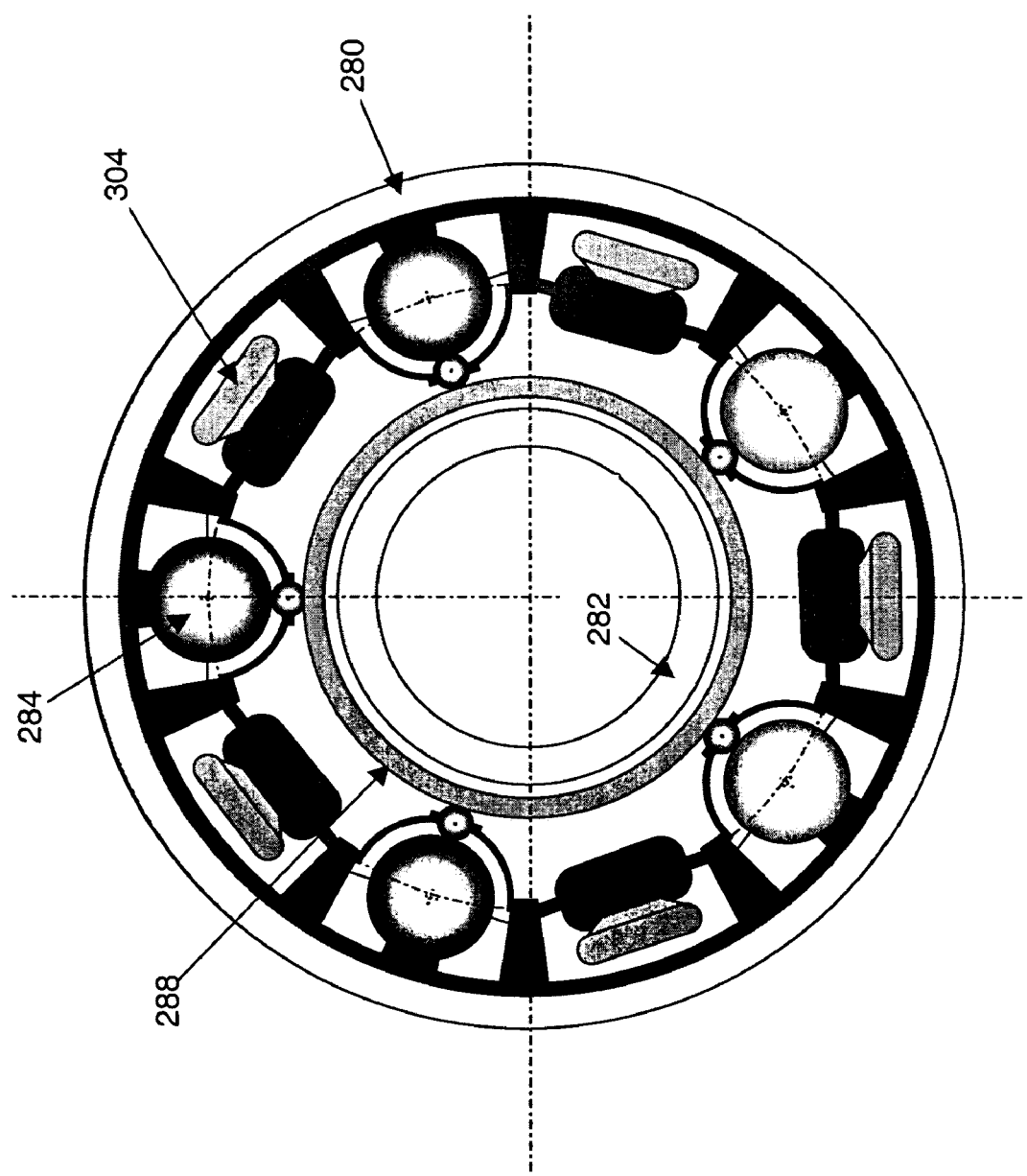
FIG. 22 is a schematic diagram illustrating a cross-sectional view along plane A of FIG. 21.

A conceptual design of a complete control system for a point-the-bit rotary steerable system is shown in FIGS. 21 and 22. FIG. 21 is a longitudinal cross-sectional view of a ball toroidal CVT control assembly for a point-the-bit rotary steerable system using a magnetic coupled turbine for power generation. FIG. 22 is a radial cross-sectional view along plane A of FIG. 21.

As shown in FIG. 21, the system includes outer housing 280 and inner housing 282. The system also includes a CVT disposed within inner housing 282. The CVT includes CVT ball assembly 284. Ball assembly 284 is coupled to CVT toroidal input ring 286 and CVT toroidal output ring 288. Therefore, the CVT has a ball-toroidal design. Toroidal input ring 286 is coupled to turbine assembly 290 by magnetic coupling 292. However, the toroidal input ring may be coupled to the turbine assembly using any suitable coupling known in the art. The turbine assembly serves as a power supply for the CVT. The turbine assembly may include any suitable turbine assembly known in the art.

The system also includes bearing assembly 294 coupled to CVT toroidal input ring 286. Bearing assembly 294 may include any suitable bearing assembly known in the art. In addition, the system includes offsetting mandrel 296 coupled to CVT toroidal output ring 288. The offsetting mandrel may be used to couple the output of the CVT to one or more components of the system (e.g., a bottom hole assembly, a drill bit, or a bit shaft) as described above. The system further includes control subsystem 298, which is coupled to ball assembly 284 by bi-directional worm gear assembly 300, bearing assembly 302, and control arm 304. Therefore, the control arms are attached to the CVT mechanism through a gear and tooth assembly allowing the translation of the control arms to be converted to rotation of the control balls in the CVT mechanism. The control arm is translated using the worm gear connected to the control assembly. Control subsystem 298 may be coupled to and controlled by control electronics 306. Control electronics 306 may include any suitable electronics known in the art. For example, the control subsystem may include an electric motor, such as a linear motor or stepper motor. The motor may be controlled by the control electronics. The control electronics includes a navigation package with sensors for measuring an earth's reference frame, a feedback system with control for the motor and communication capabilities.

A very simplistic control subsystem can be developed in tools operating in near-horizontal and horizontal boreholes or wells. One such control subsystem includes an eccentric mass that is rotationally independent from the system housings. Therefore, the eccentric mass essentially references gravity. The output shaft can be set by the electric motor to hold a given angle. The design of the eccentric mass control assembly provides for a very simple control subsystem. In some applications, the eccentric mass can replace the sensor systems, accelerometers or magnetometers, for measuring an earth's reference frame. For example, the eccentric mass may provide the necessary control feedback as a result of its inherent reference to gravity.

The concept shown in FIG. 21 includes a single stage CVT. However, it should be noted that a multiple stage CVT can be implemented, from two or more transmission stages, for greater accuracy and is most likely necessary when operating with turbine assemblies. Several factors should be taken into consideration when determining if multiple stages are preferable such as the type of CVT employed, the specific design implemented, the average rotation rates of the input and output disks, the accuracy of the control subsystem employed, and the accuracy required for the output shaft.

In designs where multiple stages are used, various types of gear reduction devices can be employed. A multiple stage CVT can be implemented as well as fixed gear ratio devices, harmonic drives, etc. For example, a fixed gear ratio device or a harmonic drive may be coupled to a CVT. A fixed gear ratio device and a harmonic drive may be configured to provide increased control of a transmission ratio of the CVT. These gear reduction devices can act as a fixed reduction device or can have their own independent control systems to achieve a constant output range. Examples of harmonic drives are illustrated in U.S. Pat. No. 4,768,996 to Kumm, U.S. Pat. No. 4,810,234 to Kumm, U.S. Pat. No. 4,824,419 to Kumm, and U.S. Pat. No. 5,011,458 to Kumm, which are incorporated by reference as if fully set forth herein. A harmonic drive incorporated in one of the systems described herein may be configured as described in these patents. Several methods can be implemented to create an "automatic" transmission from one or more of these devices.

Rotary power generation for the input of the CVT can come from various means. As described above, the embodiment shown in FIG. 21 utilizes a fluidic turbine to generate power for the system. The embodiments shown in FIGS. 23-26 provide alternative embodiments of the design utilizing various means of creating input rotation for the CVT. FIG. 23 illustrates an embodiment of a CVT rotary steerable system design utilizing a non-rotating stabilizer as a rotational input. As shown in FIG. 23, the system includes CVT 308, which is coupled to bit shaft 310 by offsetting mandrel 312, rotary drive head 314, and eccentric receptacle 316. The system also includes CVT control subsystem 318, which is configured to control one or more parameters of the CVT. In addition, the system includes universal joint 320 coupled to bit shaft 310. Therefore, the system is configured as a point-the-bit system. Non-rotating stabilizer 322 serves as a rotational system for CVT 308. The non-rotating stabilizer may be coupled to the CVT by magnetic coupling 324, which is disposed within tubular collar 326. However, the non-rotating stabilizer may be coupled to the CVT using any suitable coupling known in the art. As shown in FIG. 23, the system also includes upper radial bearings 328 and thrust bearings 330 disposed within tubular collar 326, which may include any suitable bearings known in the art. The system shown in FIG. 23 may be further configured as described herein.

FIG. 24 illustrates an alternative embodiment of a CVT rotary steerable system design utilizing a non-rotating eccentric mass as a rotational input for the CVT. As shown in FIG. 24, this system includes mechanical CVT 332, which is coupled to bit shaft 334 by offsetting mandrel 336. The system also includes universal joint 338 coupled to bit shaft 334. In addition, the system includes non-rotating eccentric mass 340 that serves as a rotational input for CVT 332. The system shown in FIG. 24 may be further configured as described herein.

Figure 25:
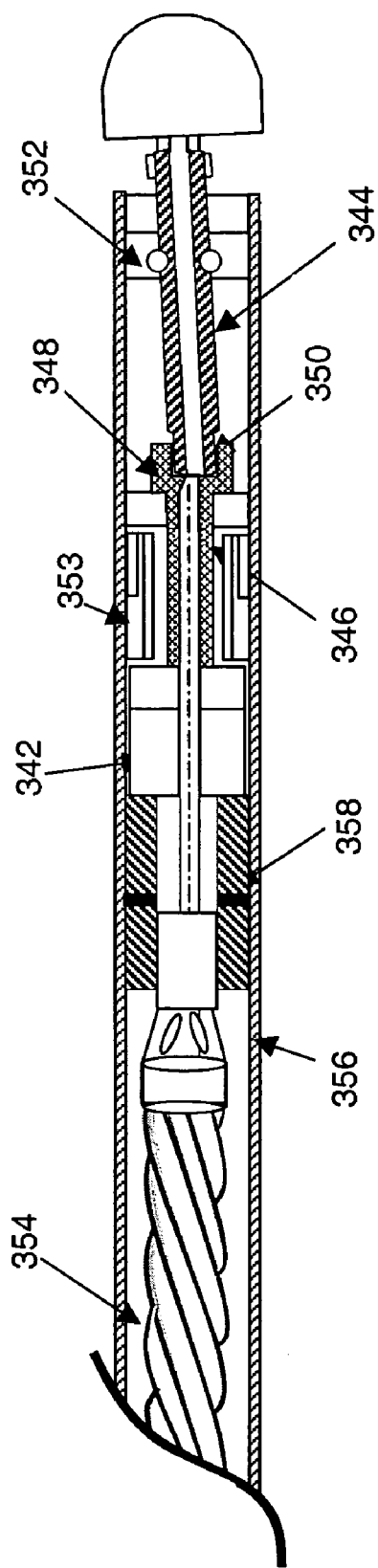
FIG. 25 is a schematic diagram illustrating a cross-sectional view of a CVT rotary steerable system design utilizing a Moyno (positive displacement motor (PDM)) motor as a rotational input.

FIG. 25 illustrates another alternative embodiment of a CVT rotary steerable system design utilizing a Moyno or positive displacement motor (PDM) motor as a rotation input. As shown in FIG. 25, this system includes CVT 342 coupled to bit shaft 344 by offsetting mandrel 346, rotary drive head 348, and eccentric receptacle 350. The system also includes universal joint 352 coupled to bit shaft 344. In addition, the system includes CVT control subsystem 353 coupled to CVT 342. CVT control subsystem 353 is configured to alter one or more parameters of CVT 342. The system further includes PDM 354 disposed within tubular collar 356. PDM 354 is coupled to CVT 342 by magnetic coupling 358. However, PDM 354 may be coupled to CVT 342 using any suitable coupling known in the art. The system shown in FIG. 25 may be further configured as described herein.

FIG. 26 illustrates a further alternative embodiment of a CVT rotary steerable system design utilizing a Moyno or PDM motor as rotational input and an additional drive mechanism for the bit shaft. As shown in FIG. 26, the system includes CVT 360. Drive shaft 362 serves as the output shaft of CVT 360 and is coupled to bit shaft 364 by offsetting mandrel 366, rotary drive head 368, and universal joint 370. The system also includes thrust bearing 372 coupled to bit shaft 364. In addition, the system includes CVT control subsystem 374 coupled to CVT 360. CVT control subsystem 374 is configured to alter one or more parameters of CVT 360. The system further includes PDM 376 disposed within tubular collar 378 and coupled to CVT 360 by magnetic coupling 380. However, PDM 376 may be coupled to CVT 360 by any other coupling known in the art. The system shown in FIG. 26 may be further configured as described herein.

An embodiment of the system utilizing a non-rotating stabilizer (NRS) allows for relative rotation between the stabilizer and collar. This rotation is used as the input for a mechanical CVT and provides for a simple mechanism and control structure. In the design, the non-rotating stabilizer is coupled to the CVT input and the control subsystem is attached to the collar. The CVT has approximately a 1:1 gear ratio. The CVT corrects for drift in the system due to rotation of the NRS within the borehole. The frequency of rotation is usually very small, e.g. on the order of a few hertz. A conical-disk CVT of the type shown in FIGS. 18 and 19 can be utilized in such embodiments. The control electronics for the system are also simplified, as the control system does not have to compensate for stick-slip of the bottom hole assembly. Stick slip is a phenomenon in drilling where frictional forces cause large variations in the revolutions per minute (rpm) as rotation energy is stored and released by the drillstring.

As described above, the concept proposed in FIG. 24 uses an eccentric mass to provide the relative rotation for the input to a CVT. The concept provides a dramatic improvement over that described by Eddison et al. in U.S. Pat. No. 5,617,926. For example, the concept proposed by Eddison et al. does not provide for accurate control of the directional vector of the bit shaft. As described by Eddison et al., the system becomes unstable if the required torque is greater than that provided by the eccentric mass. The system considered in FIG. 24 overcomes these design limitations while providing a means for accurate control of the bit shaft. The concept also allows for maximum torque output to be exceeded without the risk of system instability.

A third embodiment of a point-the-bit system utilizes a positive displacement motor (PDM), also known as a Moyno pump, as input for the CVT as described above. The CVT can be directly or indirectly coupled to the PDM, as shown in FIG. 25. An alternative embodiment, as shown in FIG. 26, allows for the PDM to provide additional power at the bit through a drive shaft coupled to the CVT for control purposes.

Figure 27:
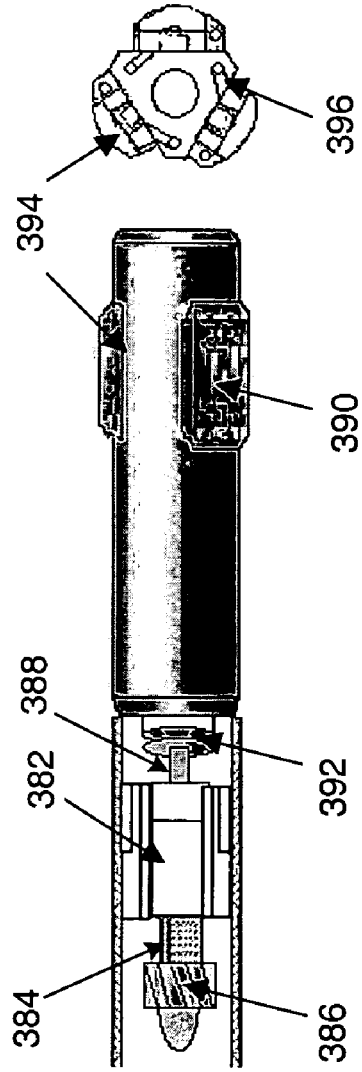
FIG. 27 is a schematic diagram illustrating a cross-sectional view of a CVT rotary steerable system design utilizing a synchronized biasing unit.
Figure 28:
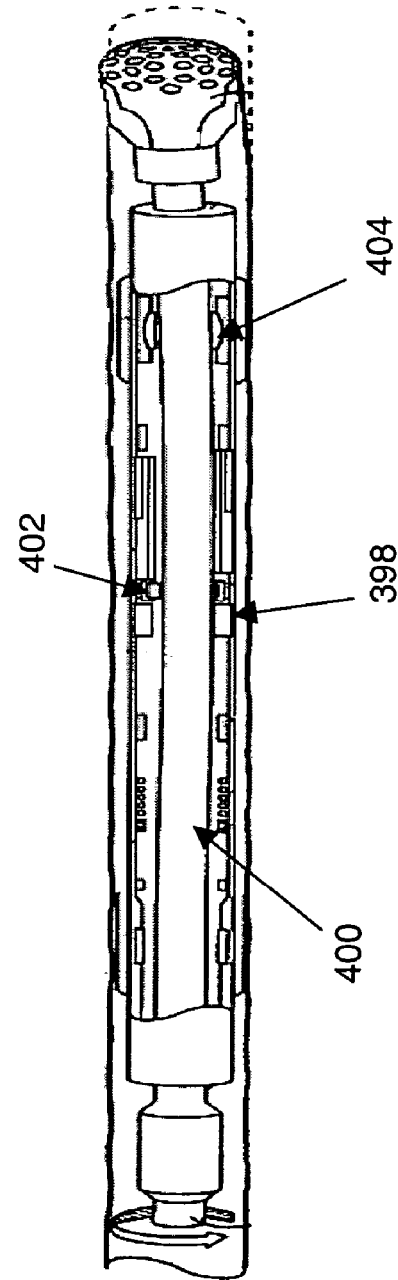
FIG. 28 is a schematic diagram illustrating a cross-sectional view of a CVT rotary steerable system design utilizing a bent shaft as a biasing unit.

Similarly, the control subsystem can be utilized with various rotary steerable biasing units with dramatic improvements to the cost, reliability and functionality. Two alternative embodiments are shown in FIGS. 27 and 28. FIG. 27 illustrates an embodiment of a CVT rotary steerable system design utilizing a synchronized biasing unit. As shown in FIG. 27, this system includes mechanical CVT 382. Control electronics (not shown) are integrated into the CVT. Input shaft 384 of mechanical CVT 382 is coupled to turbine assembly 386. However, mechanical CVT 382 may be coupled to any suitable power supply known in the art. Output shaft 388 of mechanical CVT 382 is coupled to bit connector 390 by control valve 392. In addition, actuators 394 are coupled to bit connector 390. Each actuator 394 is coupled to one of hydraulic ports 396 through which the actuators can be activated and controlled. The system shown in FIG. 27 may be further configured as described herein.

FIG. 28 illustrates an additional embodiment of a CVT rotary steerable system design utilizing a bent shaft for a biasing unit. This system includes mechanical CVT assembly 398 coupled to flexible shaft 400 and eccentric ring deflection means 402. The system also includes fulcrum bearing 404 coupled to flexible shaft 400. The system shown in FIG. 28 may be further configured as described herein.

As described above, the CVT mechanisms can be utilized for various downhole applications requiring rotational power conversion. CVT control may also be used for changing relative rotation in other downhole applications. As an example, a CVT may be used as a control mechanism for a mud-pulse telemetry system. However, it is to be understood that the CVT may be used as a control mechanism in any other measuring-while-drilling system known in the art. Examples of measuring-while-drilling systems in which a CVT may be used as a control mechanism include systems which rely on shock vibration measurements during drilling, systems that use cams to move up and down at a specific rate, measuring-while-drilling systems that are described in patents that have been incorporated by reference as if fully set forth herein, and any other measuring-while-drilling system known in the art.

One example of a mud-pulse telemetry system is described by Strom et al. in U.S. Pat. No. 4,103,281, which is incorporated by reference as if fully set forth herein. The system contains an ECVT servo-system. The basic conceptual drawing for the system is shown in FIG. 29. As shown in FIG. 29, this system includes motor 406 coupled to modulator 408 by coupling 410. Modulator 408 includes rotor 412 and stator 414. The system also includes motor control electronics 416 coupled to motor 406. Motor control electronics 416 may alter one or more parameters of the motor depending on output of sensors 418. Power is supplied to alternator 420 by turbine 422, which is coupled to the alternator by coupling 424. The system further includes alternator voltage control 426, which is configured to regulate the output voltage of the alternator to a proper value for use by the system.

The system shown in FIG. 29 can be dramatically improved by incorporation of a mechanical CVT system. The CVT-based system has several benefits over the system shown in FIG. 29 including smaller size, improved reliability and lower cost. Additional examples of measuring-while-drilling or logging-while-drilling type systems that may also be dramatically improved by incorporation of a mechanical CVT are illustrated in U.S. Pat. No. 3,309,656 to Godbey, U.S. Pat. No. 3,764,970 to Manning, U.S. Pat. No. 3,770,006 to Sexton et al., U.S. Pat. No. 3,789,355 to Patton, U.S. Pat. No. 3,792,429 to Patton et al., U.S. Pat. No. 3,820,063 to Sexton et al., and U.S. Pat. No. 3,886,495 to Sexton et al., which are each incorporated by reference as if fully set forth herein. In addition, the systems described herein may be further configured as described in these patents.

Two variations of a mechanical CVT controlled measuring-while-drilling (MWD) pulsar system are provided in FIGS. 30 and 31. As shown in FIG. 30, a system configured to perform mud-pulse telemetry includes a mechanical CVT in place of the ECVT servo-control system of FIG. 29. In particular, the system shown in FIG. 30 includes CVT 428. Power is supplied to CVT 428 by turbine assembly 430. In particular, an input of the CVT is coupled the turbine assembly. However, any other suitable power supply may be used in the system. The system also includes CVT control electronics 432, which are configured to alter one or more parameters of CVT 428. An output of CVT 428 is coupled to modulator 434 by coupling 436. CVT 428 is configured to control the modulator. In some embodiments, CVT 428 may be configured to alter a frequency at which the modulator operates to modulate an acoustic or pressure wave telemetry signal. In another embodiment, CVT 428 may be configured to control the modulator such that a rate of relative rotation of the modulator is substantially constant. In a further embodiment, the CVT may be configured to control a relative position of the modulator. The relative position can be rotational position or can be converted to an axial position.

As described above, modulator 434 includes rotor 438 and stator 440. However, it is to be understood that a modulator as described herein may include any modulator known in the art. For example, the modulator may be configured as a siren modulator. In another example, the modulator may be configured as a relative rotation type modulator. In a different example, the modulator may be configured as a positive pulse type modulator or a negative pulse type modulator. In some embodiments, the modulator may include a rotary valve to which the CVT is coupled. The rotary valve may be configured to dump a portion of drilling fluid to an annulus. Alternatively, the rotary valve may be configured to block a portion of the flow inside a drill string of the system. In another example, the modulator may include a ball screw oscillator to which the CVT is coupled. In a different example, the modulator may include a valve that is configured to operate axially. In a further example, the modulator may create restriction in an orifice.

The system also includes sensor 442. Sensor 442 may include any appropriate sensor known in the art. In addition, although the system is shown in FIG. 30 as having one sensor, it is to be understood that the system may include more than one sensor. Each of the sensors may be configured similarly or differently. The system shown in FIG. 30 may be further configured as described herein.

FIG. 31 illustrates another embodiment of a mud-pulse telemetry system utilizing a CVT. As shown in FIG. 31, the system includes CVT 444. CVT 444 is coupled to modulator 446 by coupling 448. As described above, modulator 446 includes rotor 450 and stator 452. The system also includes CVT control subsystem 454, which may be configured to alter one or more parameters of the CVT. In addition, the system includes rotational energy storage device 456. Rotational energy storage device 456 is coupled to modulator 446 through CVT 444. Torque generated from modulator 446 is converted to kinetic energy that is stored in rotational energy storage device 456. Rotational energy storage device 456 is configured such that the stored energy can be used as a power supply for CVT 444. In one embodiment, control subsystem 454 may be coupled to rotational energy storage device 456. The control subsystem may be configured to control CVT 444 as well as to control rotation rates of the rotational energy storage device such that the rotational energy storage device rotates at rates that are within its operating limits. The system shown in FIG. 31 may further include sensor 458. Sensor 458 may include any appropriate sensor known in the art. In addition, although the system is shown in FIG. 31 as having one sensor, it is to be understood that the system may include more than one sensor. Each of the sensors may be configured similarly or differently. The system shown in FIG. 31 may be further configured as described herein.

The system shown in FIG. 31 provides a conceptual embodiment of a mud-pulse telemetry system utilizing a CVT to ensure rotational rates in the modulator remain substantially constant. The torque generated from the modulator is converted to kinetic energy and stored in a rotational energy storage device. This device in the most simplistic form is a rotational mass on bearings. A high gear ratio between the modulator and storage device provide for the modulator to spin at relatively low frequencies while providing a high rotation rate at the storage device. The CVT electronics control system ensures constant rotation rates at the modulator and the ability to change frequency to modulate an acoustic or pressure wave telemetry signal as described by Strom et al. The electronic control subsystem can also limit maximum rotation rates for the storage device to keep it within safe operating limits. A simple design for limiting the rpm is through an electromagnetic braking mechanism.

Another potential solution is combining the telemetry and rotary steerable system (RSS) solutions into a single package thereby gaining additional benefits of compact packaging and cost reductions. A conceptual drawing of such a system is shown in FIG. 32. As shown in FIG. 32, this system includes CVT 460. CVT 460 is disposed within tubular collar 462. CVT 460 is also coupled to modulator 464 by coupling 466. As described above, modulator 464 includes rotor 468 and stator 470. The system also includes rotational energy storage device 472, which may be configured as described above. For example, rotational energy storage device 472 is coupled to modulator 464 through CVT 460. In addition, torque generated from modulator 464 is converted to kinetic energy that is stored in rotational energy storage device 472. Rotational storage energy device 472 is configured such that the stored energy can be used as a power supply for CVT 460. The system further includes CVT control electronics 474, which are coupled to CVT 460. CVT control electronics 474 are configured to alter one or more parameters of CVT 460.

The system shown in FIG. 32, therefore, includes CVT 460 that controls the modulator of the mud-pulse telemetry portion of the system. This system may also include additional CVT 476. CVT 476 may be configured to control rotation of one or more system components. In one particular embodiment, the one or more system components may include one or more components of a biasing subsystem. In addition, the biasing subsystem may be configured as a rotary steerable system. For example, CVT 476 may be coupled to bit shaft 478 by offsetting mandrel 480, rotary drive head 482, and eccentric receptacle 484. Universal joint 486 is also coupled to bit shaft 478. CVT 476 may be coupled to a control subsystem that is separate from and/or different than the control subsystem of CVT 460. For example, the system may include control subsystem 488 that is configured to alter one or more parameters of CVT 476. However, CVT 460 and CVT 476 may be coupled to the same power supply. For example, rotational energy storage device 472 may be coupled to CVT 460 and CVT 476 such that the rotational energy storage device may supply power to both CVTs. Therefore, rotational energy storage device 472 is utilized by two independent CVTs, which control the telemetry and orient the tool, respectively, with the modulator acting to convert the flow into stored high rpm energy for the storage device. In an alternative embodiment, CVT 460 and CVT 476 may be replaced by a single CVT that is configured to control the modulator as well as relative rotation of one or more components of the biasing subsystem.

Each of the systems described in detail above may be used to perform a variety of methods. For example, one method for drilling a borehole includes supplying power to an input shaft of a CVT. The method also includes controlling rotation of one or more system components using the CVT during drilling of the borehole. The one or more system components are coupled to an output shaft of the CVT as described further above. The CVT may be further configured as described above. For example, the CVT may be configured as an IVT in one embodiment.

In one embodiment, the method may include altering a transmission ratio of the CVT depending on one or more characteristics selected for the borehole. In another embodiment, the method may include altering a transmission ratio of the CVT depending on one or more characteristics of a formation in which the borehole is being drilled. In either embodiment, the transmission ratio of the CVT may be altered as described further above. In some embodiments, the method may include altering one or more parameters of the CVT electrically, electro-magnetically, mechanically, hydraulically, or some combination thereof during the drilling. The one or more parameters may be altered as described further above. In addition, the method may include actively or passively altering one or more parameters of the CVT during drilling of the borehole. This method may include any other step(s) described herein.

An additional embodiment relates to a method for completing a well. This method includes supplying power to an input shaft of a CVT. The method also includes controlling one or more completion tool components using the CVT during completion of the well (e.g., controlling rotation or position of the one or more completion tool components). The one or more completion tool components are coupled to an output shaft of the CVT. In one embodiment, the method may also include orienting downhole equipment within a borehole of the well to connect a latch for use in drilling of multi-lateral wells. In another embodiment, the method may include orienting downhole equipment in a borehole of the well to position sensors within the borehole or to open or close a control component (e.g., a valve) of the system. In some embodiments, the method may include controlling relative rotation of a downhole pump using the CVT to operate the pump at maximum efficiency and optimal rotation rate for fluids being pumped. In an additional embodiment, the method may include converting the rotation to axial movement along a length of a pipe using a ball screw. The axial movement may position the one or more completion tool components axially within a borehole of the well in one embodiment. The one or more completion tool components may include control elements, sensors, valves, or some combination thereof. This method may include any other step(s) described herein.

Another method that can be performed by the systems described above includes a method for directionally drilling a borehole. One such method includes controlling a tendency of a bottom hole assembly during drilling of the borehole using a biasing subsystem. As described above, the biasing subsystem may be configured as a rotary steerable system. In addition, the biasing subsystem may include one or more adjustable stabilizers. As further described above, the biasing subsystem may be configured as a push-the-bit system or a point-the-bit system. Controlling the tendency of the bottom hole assembly may include controlling the tendency of the bottom hole assembly in two or three dimensions. In addition, controlling the tendency of the bottom hole assembly may include rotationally positioning the bottom hole assembly or axially positioning the bottom hole assembly.

The method also includes controlling relative rotation of one or more components of the biasing subsystem using a CVT during the drilling. The one or more components are coupled to an output shaft of the CVT. As described above, the CVT may be configured as an CVT. In some embodiments, the method may also include altering a transmission ratio of the CVT depending on one or more characteristics selected for the borehole and/or one or more characteristics of a formation in which the borehole is being drilled. In one embodiment, the method may further include altering one or more parameters of the CVT electrically, electro-magnetically, mechanically, hydraulically, or some combination thereof during the drilling. In addition, the method may include actively or passively altering one or more parameters of the CVT during the drilling as described above. This method may also include any other step(s) described herein.

An additional method that can be performed by the systems described above includes a method for performing mud-pulse telemetry. One such method. includes controlling a modulator of a mud-pulse telemetry system using a CVT coupled to a modulator. In one embodiment, the method may include altering a frequency at which the modulator operates using the CVT to modulate an acoustic or pressure wave telemetry signal. In another embodiment, the modulator may be controlled such that a rate of relative rotation of the modulator is substantially constant. In some embodiments, the method may include converting torque generated from the modulator to kinetic energy, storing the kinetic energy, and using the stored kinetic energy as a power supply for the CVT. In one embodiment, the method may also include controlling relative rotation of one or more components of a biasing subsystem using the CVT. In a different embodiment, the method may include controlling relative rotation of one or more components of a biasing subsystem using an additional CVT. In one such embodiment, the method may include converting torque generated from the modulator to kinetic energy, storing the kinetic energy, and using the stored kinetic energy as a power supply for the CVT and the additional CVT. This method may also include any other steps(s) described herein.

Figure 33:
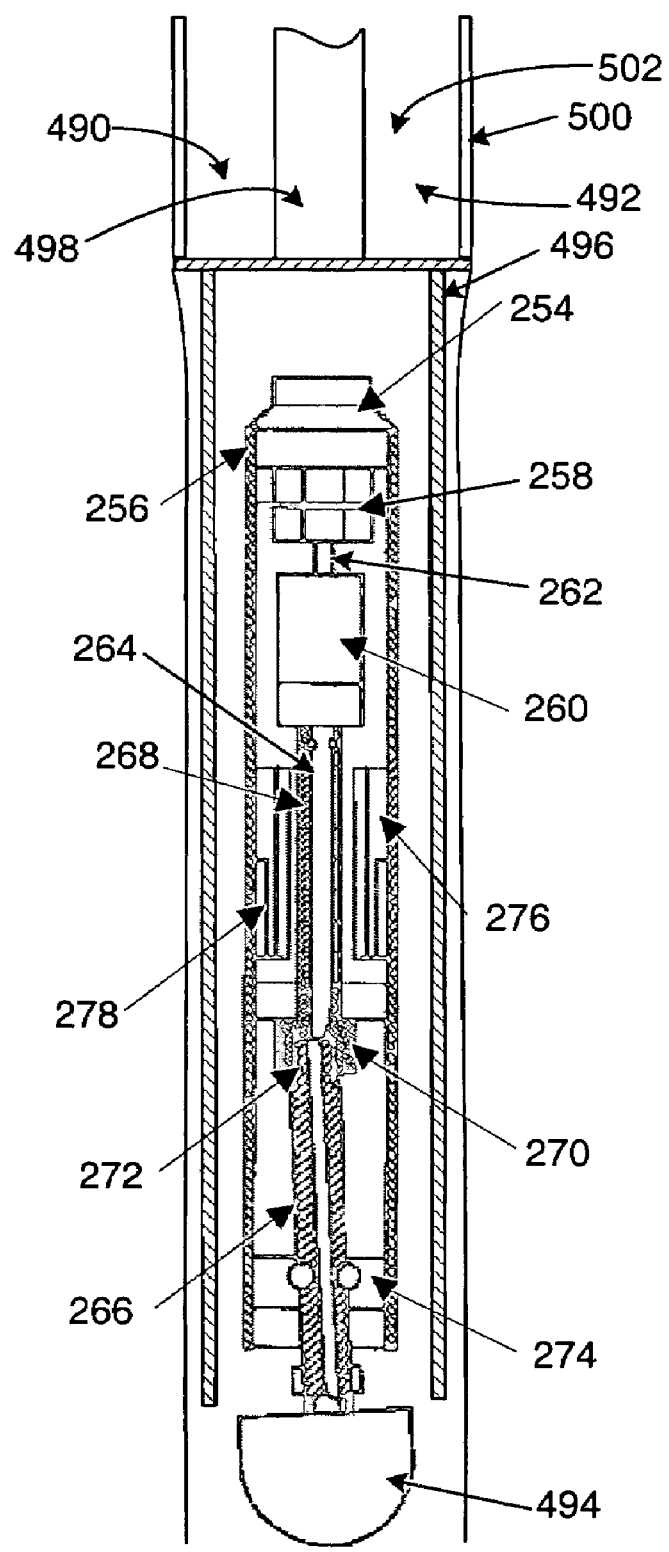
FIG. 33 is a schematic diagram illustrating a cross-sectional view of a borehole being drilled by the system shown in FIG. 20.

In addition, a variety of boreholes may be drilled using the above described systems and methods. FIG. 33 illustrates one example of a borehole being drilled by the system illustrated in FIG. 20. Elements that are shown in FIGS. 20 and 33 and that may be similarly configured have been indicated using the same reference numerals. As further shown in FIG. 33, the system drills borehole 490. Although borehole 490 is shown in FIG. 33 to be drilled in a generally vertically direction, it is to be understood that the borehole may be drilled at a variety of directions or angles (e.g., horizontally). In addition, although an entirety of the borehole is shown to be drilled in one general direction, it is to be understood that different portions of the borehole may be drilled in different directions.

The system includes drill string 492 and a supporting derrick (not shown), which supports the drill string within the borehole. Drill string 492 includes bit 494, one or more drill collars 496, and a length of drill pipe 498 extending into the borehole. The pipe is coupled to a kelly (not shown), which extends through a rotary drive mechanism (not shown). Actuation of the rotary drive mechanism rotates the kelly which in turn rotates the drill pipe and the bit.

Positioned near the entrance to the borehole is a drilling fluid circulation system (not shown), which circulates drilling fluid, commonly referred to as mud, downwardly into the borehole. The mud is circulated downwardly through the drill pipe during drilling, exits through jets (not shown) in the bit into the annulus, and returns uphole where it is received by the system. The circulating system may include any suitable circulating system known in the art. Mud returning from downhole exits near the mouth of borehole 490 from an aperture in casing 500 which provides flow passage 502 between the walls of the borehole and the drill pipe. The system and the borehole shown in FIG. 33 may be further configured as known in the art. For example, the system may include any other components of any drilling system known in the art. In one particular example, the system shown in FIG. 33 may be further configured as described in U.S. Pat. No. 4,103,281 to Strom et al., which is incorporated by reference as if fully set forth herein.

Figure 34:
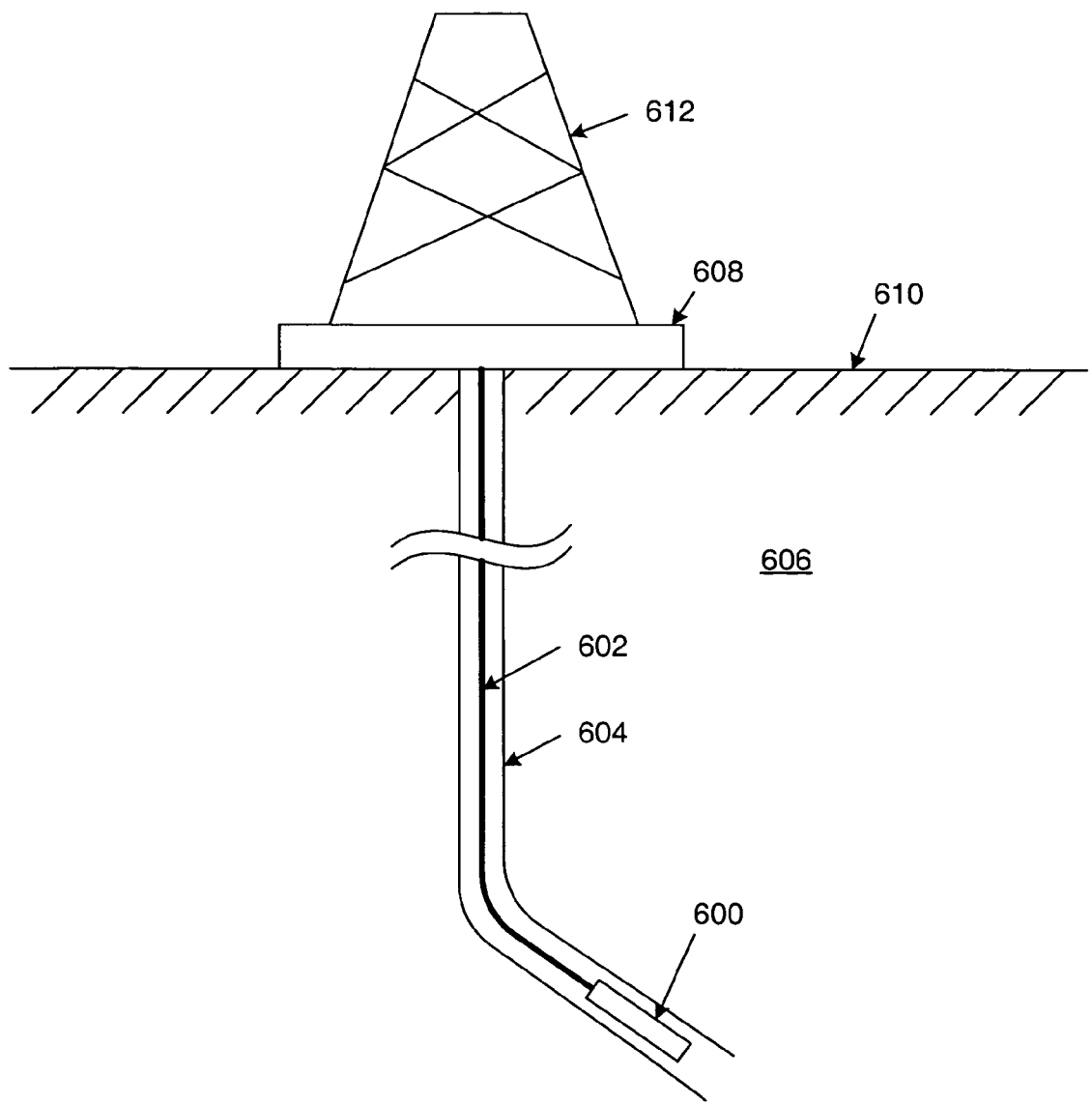
FIG. 34 is a schematic diagram illustrating a system as described herein in an application for drilling a borehole such as a borehole for an oil well.

FIG. 34 illustrates a system as described herein in an application for drilling a borehole such as a borehole for an oil well. As shown in FIG. 34, system 600 is coupled to conveyance means 602. System 600 may be configured according to any of the embodiments described herein. In this embodiment, conveyance means 602 may include a drill string. Alternatively, conveyance means 602 may include any of the other conveyance systems described herein or any other conveyance system known in the art. Conveyance means 602 moves system 600 within borehole 604 as the borehole is being drilled in formation 606. Formation 606 may include any formation known in the art. As shown in FIG. 34, the borehole is a multi-angular borehole. In other words, the borehole is directionally drilled by system 600. Alternatively, the borehole may be drilled in a single direction. Platform 608 is located above surface 610 of formation 606. Platform 608 may be configured as known in the art. Derrick 612 is disposed on platform 608 and is coupled to conveyance means 602 in borehole 604. The derrick may include any suitable derrick known in the art.

Although the above embodiments have been described generally with reference to oil well drilling applications, it is to be understood that the systems and methods described herein may be used in a variety of other applications. For example, the systems and methods described herein may be used in construction applications and in applications for installing pipe or other equipment underground.

Figure 35:
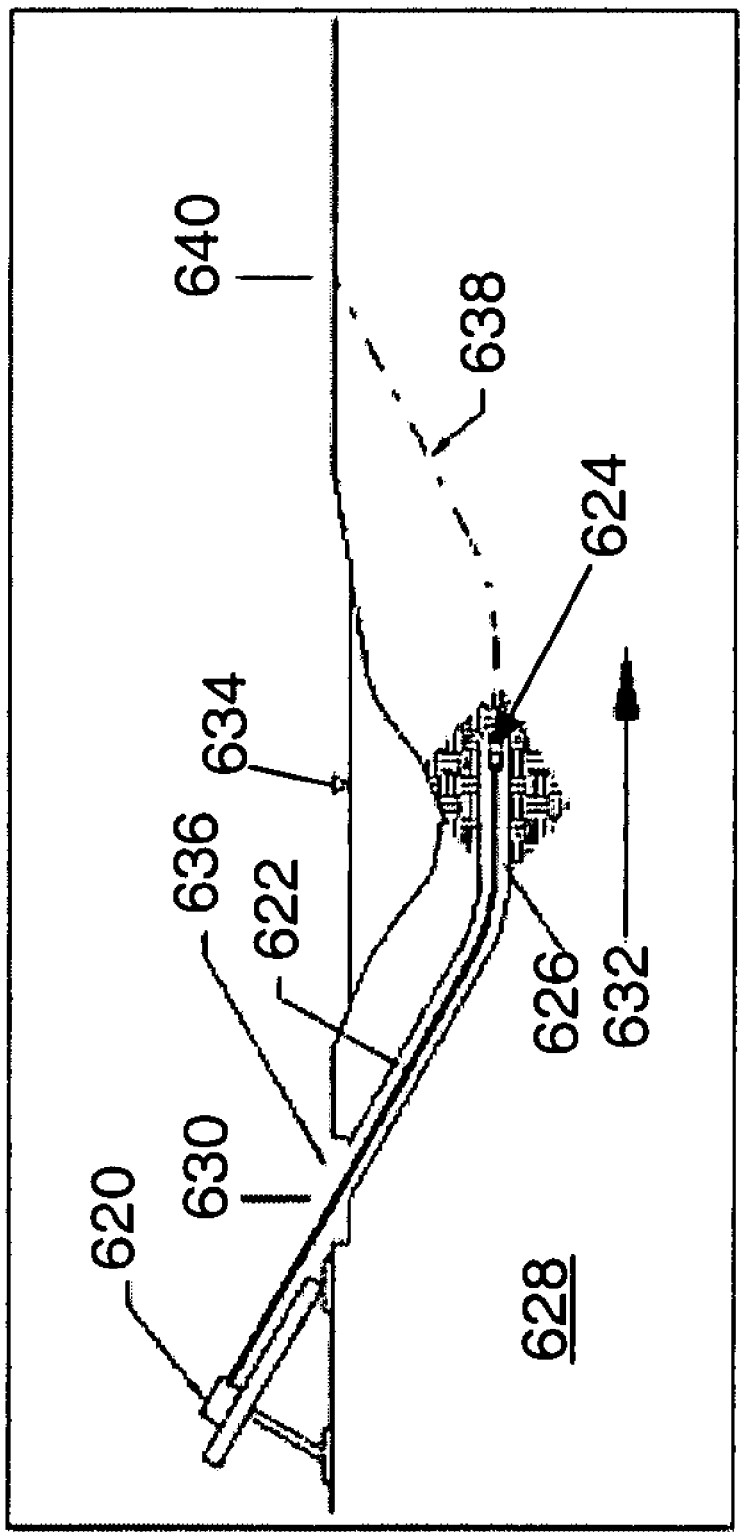
FIG. 35 is a schematic diagram illustrating a horizontal directional drilling application for installing pipe underneath surface obstacles in which the systems described herein may be used.

In one particular example, FIG. 35 illustrates a horizontal directional drilling (HDD) application for installing pipe underneath surface obstacles in which the systems described herein may be used. As shown in FIG. 35, the HDD that is shown is a trenchless technique for installing pipe below, in this case, a river. However, the HDD technique may be used to drill beneath or around any other obstacles as well. Since the HDD technique is similar to directionally drilling a borehole for an oil well, drill pipe and down-hole tools are generally interchangeable.

The first stage, which is shown in FIG. 35, includes directionally drilling a relatively small diameter pilot hole along a designed directional path. In the illustrated example, horizontal drilling rig 620 is coupled to drill pipe 622, which serves as a conveyance means for system 624. Horizontal drilling rig 620 and drill pipe 622 may include any suitable drilling rig and drill pipe, respectively, known in the art. In addition, the drill pipe may be replaced with a different conveyance means in some embodiments. System 624 may be configured according to any of the embodiments described herein. System 624 is configured to drill borehole 626 into formation 628 from entry point 630 in general direction 632 under river 634. The formation may include any formation known in the art. Drilling fluid (not shown) may exit borehole from annular space 636 surrounding drill pipe 622 near entry point 630. As further shown in FIG. 35, designed drill path 638 has yet to be drilled in formation 628. At completion of drilling, the borehole is designed to exit the formation at exit point 640.

It will be appreciated to those skilled in the art having the benefit of this disclosure that this invention is believed to provide systems and methods utilizing continuous variable transmissions for use in drilling and other applications. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for drilling a borehole, comprising a continuously variable transmission and a control subsystem coupled to the continuously variable transmission to alter one or more parameters of the continuously variable transmission, wherein an input shaft of the continuously variable transmission is coupled to a power supply, and wherein an output shaft of the continuously variable transmission is coupled to one or more system components such that the continuously variable transmission controls rotation of the one or more system components.

2. The system of claim 1, wherein a transmission ratio of the continuously variable transmission is varied depending on one or more characteristics selected for the borehole.

3. The system of claim 1, wherein a transmission ratio of the continuously variable transmission is varied depending on one or more characteristics of a formation in which the borehole will be drilled.

4. The system of claim 1, wherein the continuously variable transmission comprises mechanical elements for controlling the rotation of the one or more system components.

5. The system of claim 1, wherein the continuously variable transmission comprises conical elements, and wherein relative rotation of the conical elements controls the rotation of the one or more system components.

6. The system of claim 1, wherein the continuously variable transmission comprises spherical elements, and wherein relative rotation of the spherical elements controls the rotation of the one or more system components.

7. The system of claim 1, wherein the continuously variable transmission comprises disk elements, and wherein relative rotation of the disk elements controls the rotation of the one or more system components.

8. The system of claim 1, wherein the continuously variable transmission comprises toroidal elements, and wherein relative rotation of the toroidal elements controls the rotation of the one or more system components.

9. The system of claim 1, wherein the continuously variable transmission comprises one or more belts coupled to pulley elements, and wherein an effective diameter of the pulley elements controls the rotation of the one or more system components.

10. The system of claim 1, wherein the continuously variable transmission comprises a gear and tooth assembly that couples control arms to mechanical elements of the continuously variable transmission, wherein translation of the control arms is converted to rotation of the mechanical elements, and wherein relative rotation of the mechanical elements controls the rotation of the one or more system components.

11. The system of claim 1, wherein the output shaft of the continuously variable transmission is further coupled to the one or more system components by a mandrel.

12. The system of claim 1, wherein the continuously variable transmission comprises a central cylinder traversing its longitudinal axis, and wherein the central cylinder is configured such that drilling fluid can flow through the central cylinder.

13. The system of claim 1, wherein the control subsystem comprises an electrical subsystem that is configured to alter one or more parameters of the continuously variable transmission.

14. The system of claim 1, further comprising a control subsystem coupled to the continuously variable transmission, wherein the control subsystem comprises an electro-magnetic subsystem that is configured to alter one or more parameters of the continuously variable transmission.

15. The system of claim 1, further comprising a control subsystem coupled to the continuously variable transmission, wherein the control subsystem comprises a mechanical subsystem that is configured to alter one or more parameters of the continuously variable transmission.

16. The system of claim 1, further comprising a control subsystem coupled to the continuously variable transmission, wherein the control subsystem comprises a hydraulic subsystem that is configured to alter one or more parameters of the continuously variable transmission.

17. The system of claim 1, further comprising a control subsystem coupled to the continuously variable transmission, wherein the control subsystem comprises an electrical subsystem, an electro-magnetic subsystem, a mechanical subsystem, a hydraulic subsystem, or some combination thereof that is configured to alter one or more parameters of the continuously variable transmission.

18. The system of claim 1, further comprising a control subsystem coupled to the continuously variable transmission, wherein the control subsystem is configured to actively alter one or more parameters of the continuously variable transmission.

19. The system of claim 1, further comprising a control subsystem coupled to the continuously variable transmission, wherein the control subsystem is configured to passively alter one or more parameters of the continuously variable transmission.

20. The system of claim 1, wherein the input shaft of the continuously variable transmission is further coupled directly to the power supply.

21. The system of claim 1, wherein the power supply is generated by relative rotation between elements of the system or between one or more elements of the system and a formation in which the borehole is being drilled.

22. The system of claim 1, wherein the power supply comprises a turbine assembly.

23. The system of claim 1, wherein the power supply comprises an electric motor.

24. The system of claim 1, wherein the power supply comprises a positive displacement motor.

25. The system of claim 1, wherein the power supply comprises a turbine assembly in combination with a positive displacement motor.

26. The system of claim 1, wherein the continuously variable transmission is configured as an infinitely variable transmission.

27. The system of claim 1, further comprising a fixed gear ratio device coupled to the continuously variable transmission, wherein the fixed gear ratio device is configured to provide increased control of a transmission ratio of the continuously variable transmission.

28. The system of claim 1, further comprising a harmonic drive coupled to the continuously variable transmission, wherein the harmonic drive is configured to provide increased control of a transmission ratio of the continuously variable transmission.

29. The system of claim 1, wherein the system is further configured as a rotary steerable system.

30. The system of claim 1, wherein the system is further configured as a measuring-while-drilling system.

31. The system of claim 1, wherein the system further comprises a conveyance means, and wherein the conveyance means comprises wireline, coiled tubing, a drill string, casing while drilling means, or self propelled means.

32. The system of claim 1, further comprising an adjustable stabilizer.

33. The system of claim 1, further comprising a biasing subsystem.

34. The system of claim 1, further comprising a biasing subsystem that is configured to rotationally position the one or more system components.

35. The system of claim 1, further comprising a biasing subsystem that is configured to axially position the one or more system components.

36. The system of claim 35, wherein the one or more system components are coupled to a ball screw.

37. The system of claim 1, wherein the system is further configured to drill at an angle to the borehole using a deflecting tool.

38. A borehole drilled by a method, the method comprising:
supplying power from a downhole fluid-driven power supply to an input shaft of a continuously variable transmission; and
controlling and varying rotation of one or more system components using the continuously variable transmission during drilling of the borehole, wherein the one or more system components are coupled to an output shaft of the continuously variable transmission.

39. The method of claim 38, including varying a transmission ratio of the continuously variable transmission depending on one or more characteristics selected for the borehole.

40. The method of claim 38, including varying a transmission ratio of the continuously variable transmission depending on one or more characteristics of a formation in which the borehole will be drilled.

41. The method of claim 38, including conveying the continuously variable transmission in the borehole by a wireline, coiled tubing, a drill string, casing while drilling, or self-propelled.

42. The method of claim 38, including rotationally positioning the continuously variable transmission with a biasing subsystem.

43. The method of claim 38, including axially positioning the continuously variable transmission with a biasing subsystem.

44. The method of claim 38, including drilling the borehole using a drilling system component and deflecting the drilling system component.

45. A system configured to complete a well, comprising a continuously variable transmission, wherein an input shaft of the continuously variable transmission is coupled to a relative rotation power supply driven by downhole fluid flow, and wherein an output shaft of the continuously variable transmission is coupled to one or more completion tool components such that the continuously variable transmission controls rotation of the one or more completion tool components.

46. The system of claim 45, wherein the system is further configured to orient downhole equipment in a borehole of the well to position sensors within the borehole or to open or close a control component of the system.

47. The system of claim 45, wherein the continuously variable transmission is further configured to control relative rotation of a downhole pump to operate the pump at maximum efficiency and optimal rotation rate for fluids being pumped.

48. The system of claim 45, wherein the system is further configured to convert the rotation to axial movement along a length of a pipe using a ball screw.

49. The system of claim 48, wherein the axial movement positions the one or more completion tool components axially within a borehole of the well.

50. The system of claim 49, wherein the one or more completion tool components comprise control elements, sensors, valves, or some combination thereof.

51. A well completion method comprising:
supplying power directly from a downhole fluid-driven turbine to an input shaft of a continuously variable transmission;
controlling rotation of one or more completion tool components using the continuously variable transmission during completion of the well, wherein the one or more completion tool components are coupled to an output shaft of the continuously variable transmission; and
controlling orientation of one or more completion tool components within the borehole of the well using the continuously variable transmission.

52. The method of claim 51, further comprising orienting the completion tool components in a borehole of the well to position sensors within the borehole.

53. The method of claim 51, further comprising orienting the completion tool components in a borehole of the well to open or close a control component of the system.

54. The method of claim 51, further comprising controlling relative rotation of a downhole pump using the continuously variable transmission to operate the pump at maximum efficiency and optimal rotation rate for fluids being pumped.

55. The method of claim 51, further comprising converting the rotation of said one or more completion tool components to axial movement along a length of a pipe using a ball screw.

56. The method of claim 55, wherein the axial movement positions the one or more completion tool components axially within a borehole of the well.

57. The method of claim 51, wherein the one or more completion tool components comprise control elements, sensors, valves, or some combination thereof.

* * * * *